US012186745B2

(12) United States Patent
Gartner et al.

(10) Patent No.: US 12,186,745 B2
(45) Date of Patent: Jan. 7, 2025

(54) FLUIDIC SYSTEM FOR TAKING IN, DISPENSING AND MOVING LIQUIDS, METHOD FOR PROCESSING FLUIDS IN A FLUIDIC SYSTEM

(71) Applicant: Microfluidic Chipshop GmbH, Jena (DE)

(72) Inventors: Claudia Gartner, Jena (DE); Richard Klemm, Jena (DE); Christian Moche, Jena (DE)

(73) Assignee: Microfluidic Chipshop GmbH, Jena (DE)

( * ) Notice: Subject to any disclaimer, the term of this patent is extended or adjusted under 35 U.S.C. 154(b) by 1075 days.

(21) Appl. No.: 17/055,860

(22) PCT Filed: May 16, 2019

(86) PCT No.: PCT/EP2019/062679
§ 371 (c)(1),
(2) Date: Jun. 2, 2021

(87) PCT Pub. No.: WO2019/219844
PCT Pub. Date: Nov. 21, 2019

(65) Prior Publication Data

US 2021/0291175 A1 Sep. 23, 2021

(30) Foreign Application Priority Data

May 16, 2018 (DE) ..................... 10 2018 111 822.8

(51) Int. Cl.
*B01L 3/00* (2006.01)

(52) U.S. Cl.
CPC ... *B01L 3/502715* (2013.01); *B01L 3/502723* (2013.01); *B01L 3/50273* (2013.01);
(Continued)

(58) Field of Classification Search
CPC ..... B01L 2200/0605; B01L 2300/0681; B01L 2300/0825; B01L 2400/0481;
(Continued)

(56) References Cited

U.S. PATENT DOCUMENTS

2003/0162304 A1 8/2003 Dority et al.
2010/0159574 A1* 6/2010 Shin .................... G01N 21/645 422/68.1

(Continued)

FOREIGN PATENT DOCUMENTS

CN 101300472 A 11/2008
DE 10001116 A1 7/2001

(Continued)

OTHER PUBLICATIONS

Wang et al., "Simple filter microchip for rapid separation of plasma and viruses from whole blood"; International Journal of Nanomedicine, 2012, vol. 7, pp. 5019-5028, DovePress, Macclesfield, United Kingdom.

*Primary Examiner* — Jennifer Wecker
(74) *Attorney, Agent, or Firm* — Potomac Law Group, PLLC; Vincent M DeLuca

(57) ABSTRACT

A fluidic system includes a chamber with movable elements. The chamber is connected to a channel. The system contains at least one structured component and at least one element affixed thereto and at least one fluidic interface which can be closed by means of a cap or valve. Fluids or gases can be moved via one or more channels, and moreover can be dispensed from or taken into the system, by moving the movable element both into and out of the chamber. There is provided an additional element (filters, membranes, frits or similar elements) or integrated reagents which can be arranged in the form of an array of identical or different reagents.

30 Claims, 25 Drawing Sheets

(52) U.S. Cl.
CPC ............... *B01L 3/523* (2013.01); *B01L 3/527* (2013.01); *B01L 2200/0605* (2013.01); *B01L 2300/0681* (2013.01); *B01L 2300/0825* (2013.01); *B01L 2400/0481* (2013.01); *B01L 2400/0644* (2013.01)

(58) Field of Classification Search
CPC ....... B01L 2400/0644; B01L 3/502715; B01L 3/502723; B01L 3/50273; B01L 3/52; B01L 3/523; B01L 3/527
See application file for complete search history.

(56) References Cited

U.S. PATENT DOCUMENTS

| | | | | |
|---|---|---|---|---|
| 2010/0173394 | A1* | 7/2010 | Colston, Jr. | B01L 3/502715 422/68.1 |
| 2013/0244241 | A1 | 9/2013 | Fabra et al. | |
| 2015/0158026 | A1 | 6/2015 | Battrell et al. | |
| 2016/0279551 | A1* | 9/2016 | Foucault | G01N 33/491 |
| 2021/0291182 | A1* | 9/2021 | Gollob | B01L 3/502715 |

FOREIGN PATENT DOCUMENTS

| | | | |
|---|---|---|---|
| DE | 102005054924 | A1 | 5/2007 |
| EP | 1852703 | A1 | 11/2007 |
| GB | 2516669 | A | 2/2015 |
| RU | 2380418 | C1 | 1/2010 |
| RU | 2478431 | C2 | 4/2013 |
| RU | 2521639 | C2 | 7/2014 |
| RU | 2599657 | C2 | 10/2016 |
| WO | 2008055257 | A2 | 5/2008 |
| WO | 2015084458 | A2 | 6/2015 |
| WO | 2018091608 | A1 | 5/2018 |

* cited by examiner

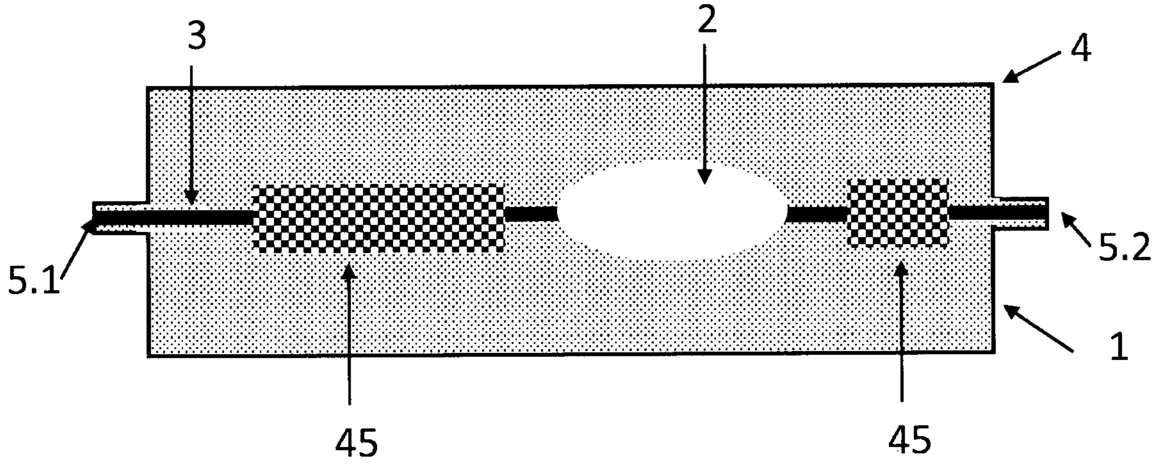
Fig. 19 a)
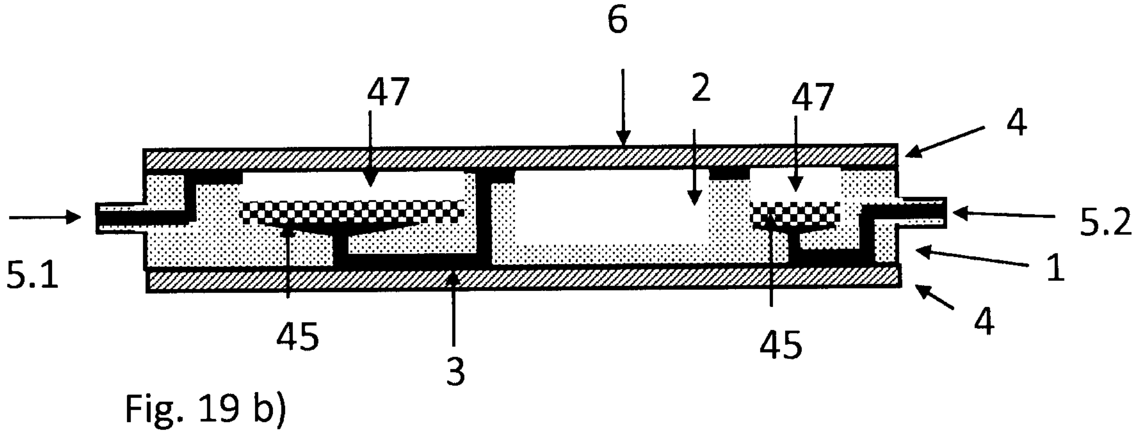
Fig. 19 b)
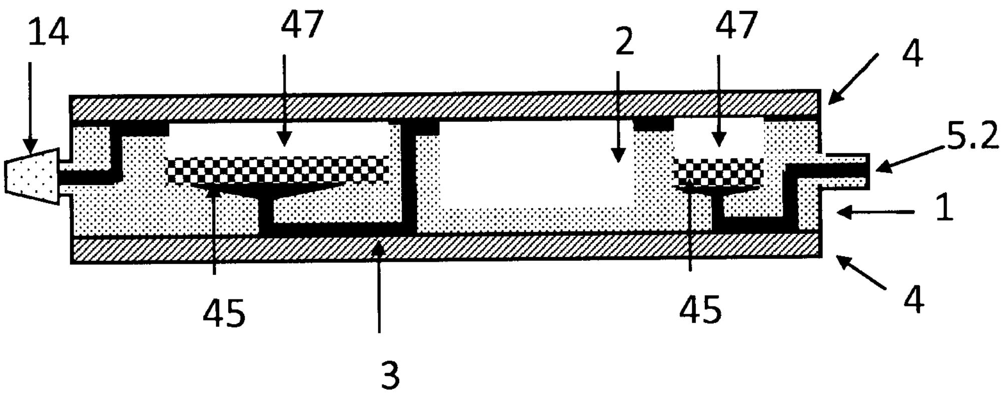

Fig. 28 a)
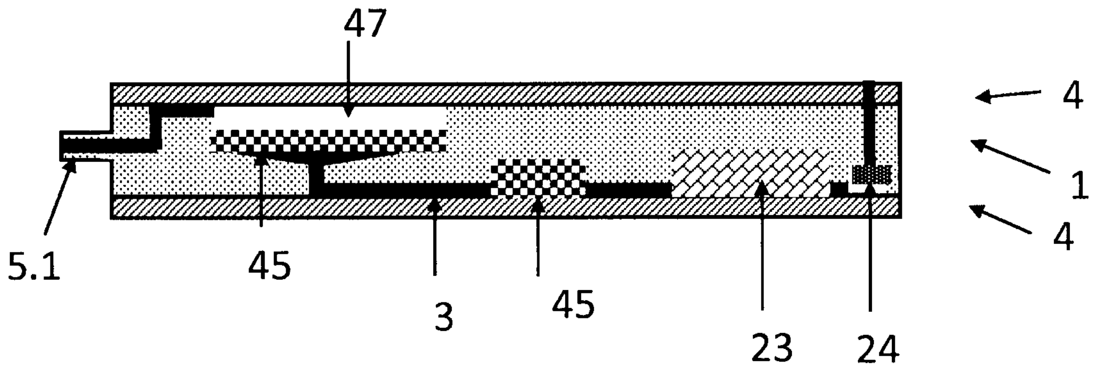
Fig. 28 b)
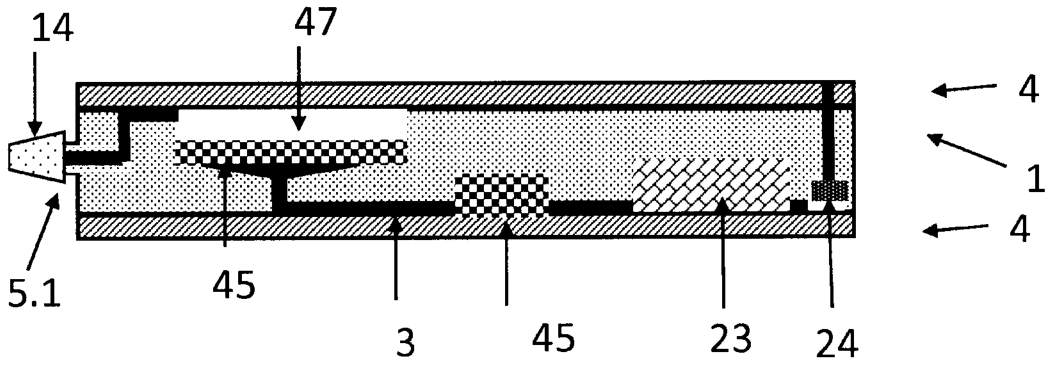
Fig. 28 c)

FLUIDIC SYSTEM FOR TAKING IN, DISPENSING AND MOVING LIQUIDS, METHOD FOR PROCESSING FLUIDS IN A FLUIDIC SYSTEM

The invention relates to a device for receiving, discharging, diluting or moving fluids as well as for adding fluid components, for separating, filtering, fractionating, enriching fluids and/or their constituents as well as for modifying fluids and their constituents and for detecting the constituents of the fluids, and which can also be described as a fluidic system, in particular a microfluidic system. The device can also be called a chip. Furthermore, the invention relates to a method for processing fluids in a fluidic system.

BACKGROUND

The intake and discharge of fluids and gases as well as their movement including mixing in fluidic systems, separation, filtering, fractionation, and enrichment of fluids and their constituents, as well as the modification of fluids and their constituents and the detection of substances, particularly in microfluidic systems, is often carried out via an externally connected pump, which is connected to the fluidic system via a fluidic interface, via syringe pumps integrated into the fluidic system or via membrane valves. All these solutions require an appropriate control device to operate the pumps or valves and are not suitable for easily implementing functions such as receiving, discharging and/or moving fluids in lab-on-a-chip systems in a simple way or even manually.

The external pumps used to manipulate lab-on-a-chip systems require a fluidic interface, which requires additional components to be used, and which, like all fluidic interfaces, involves the risk of leakage. Furthermore, additional connected devices for performing the above-mentioned partial functions pose the risk of contamination and/or falsification of the analysis results in addition to a time delay.

Syringe pumps integrated directly into fluidic systems avoid a fluidic interface to the outside, but require another element, the plunger, in order to move fluids.

Membrane valves offer the advantage that they do not require a fluidic interface or any other components and only require a pre-formed recess and a movable cover for actuation. They are configured in such a way that they can be operated pneumatically or mechanically. Generally, these membrane valves are operated by an appropriate operating device.

The intake and discharge of fluids, the distribution to different reaction cavities, the movement of fluids as well as the addition of reaction components require manual handling steps or a corresponding automation of these steps by means of large automats. This is done manually during sample collection and reagent supply by pipetting, mixing and incubation is carried out, for example, by shaking titer plates and reagents are taken from appropriate storage containers for supply. Both manual handling and automated handling require a larger number of handling steps, additional equipment such as pipettes or pipette automats as well as storage facilities for the corresponding reagents.

In microfluidic systems, handling is usually carried out via external pumps and a device is required to control the system.

The separation, filtration, enrichment and/or fractionation of fluids and their components is often performed by means of filters and/or membranes and/or density gradients in a fluid and in combination with a filtration of the vessels containing the filters/membranes and/or density gradients in order to separate the sample accordingly. Here, too, additional devices and manual handling steps are required in addition to the test vessel.

This invention combines all handling steps including reagent storage on a manually operated component.

SUMMARY OF THE INVENTION

The object of the invention is to be able to take in, dispense, dilute, transport and/or mix fluids as well as separate, filter, enrich and/or fraction fluids and their components and modify fluids and their components as well as detect the components of the fluids manually, i.e. without any further aids, as well as with corresponding devices. This should preferably be possible in fluidic systems without an external pump or suction device, preferably also manually. A particular feature of the system is that multiple intakes and discharges of fluids are possible and that desired volumes of the received and/or discharged fluid can be precisely controlled. It is also an object to provide methods for processing fluids with such fluidic systems.

A fluidic system is provided, comprising a structured component with a chamber and a channel system, which are sealed fluid-tight with a component, wherein the chamber is fluidically connected to the outside via the channel system and a fluidic interface. The component has a flexible or movable portion that can be moved into the chamber portion or beyond a plane of the chamber. The plane of the chamber is the upper boundary of the chamber on the side to the chamber, i.e. the bottom side of the component closing the chamber. By moving the flexible portion, fluids or gases can be taken in or discharged through the fluidic interface and/or moved in the fluidic system. The moving portion can be moved manually or with an appropriate operating device. One option is to push or move the flexible portion up into different positions. Particularly advantageous are the possibility of a defined fluid discharge and intake through the combination of the chamber with a small channel system, the multiple intakes and discharges of fluids as well as the possibility of manual operation.

The fluidic system preferably has an interface for a fluid reagent reservoir.

The flexible or movable portion is preferably accessible from the outside.

Particularly advantageous is the configuration of the component which closes the structured component as a foil, wherein the foil is also the moving component due to its intrinsic flexibility.

The structured component can preferably be provided with one covering component each on its top and bottom side. This allows channel systems and/or parts thereof to be arranged on both sides of the structured component and sealed with the components. Thus, the channel system can be easily inserted into the structured component on one or both sides from the respective surface and the channels on both sides can be connected by holes. In the area of the chamber, the component can be configured flexible or it can be configured as a foil, which then serves as a flexible portion in the area of the chamber, as it is flexible in its basic properties.

The dilution of the received fluid and/or the supply of reagents takes place via the emptying of a fluid reservoir connected to the structured component, which can be configured as a blister. The external geometry of the fluidic interfaces can influence the fluid intake and fluid discharge.

The volume can be defined by the corresponding outlet geometry of the fluidic interface, wherein this volume definition can be further influenced by a surface modification of the fluidic interface.

Another fluidic system is also provided, comprising a structured component with a chamber and a channel system which are hermetically sealed with a further component, the chamber being fluidically connected to the outside via the channel system and a fluidic interface. The flexible portion is formed by the walls of the chamber.

A particular advantage here is that a lateral pressing of the chamber also enables the movement of the fluid or the compression effect can be increased by the flexible chamber walls.

In addition, a further fluidic system is provided, comprising a structured component or a structured module as well as a further component which seals the chamber and the channel system hermetically and connects the chamber to the outside via the channel system and the fluidic interface. The structured component is configured in such a way that the chamber bottom is flexible and can be pushed in or expanded.

A particular advantage of this embodiment is that the bottom can be configured to be particularly flexible and can be manufactured by means of two-component injection moulding, so that a flexible component can be injection-moulded together with another component. Alternatively, the base material of the structured component can also be sufficiently flexible to guarantee the functionality of the component. An assembly of the flexible portion into the structured component is also possible.

The chamber can be connected to a fluidic interface via another channel system, wherein one of the fluidic interfaces can be closed with a cap. The closure with a cap also prevents fluid from escaping at this point.

Preferably, the integration of valves, for example capillary stopping valves, which act by changing the capillary diameter, allows the intake of defined volumes.

Preferably, a valve function is created by local modification of the surface, and/or the function of existing geometrically acting valves is enhanced a by surface modification in the valve area.

A particular advantage of this embodiment is that venting can take place when fluid is taken in through the second fluidic interface and that fluid can also be taken in and discharged at various points. The closure with the cap also prevents fluid from escaping at this point. Furthermore, it is advantageous to position the fluidic system in such a way that the discharging fluidic interface is inclined downwards when the fluid is discharged.

Preferably, the fluidic system includes a venting option for the chamber, which can be provided via an additional channel communicating with the outside or a gas-permeable membrane, and this venting device can be optionally closed.

Preferably, the fluidic system includes an inlet channel, which has a passive stopping function, for example a capillary stopping valve, a channel tapering or a corresponding surface modification, and receives a defined quantity of fluid either by a capillary effect, which can be intensified by surface modifications in the portion to be filled, or by a change in the chamber volume caused by the moving components.

The intake of very precise volumes without the use of expensive pipetting units is particularly advantageous here.

In a preferred configuration, the fluidic system includes an additional reagent reservoir. This can be formed as a blister, for example.

The particular advantage here is that several fluids or dry reagents can be mixed together and the reagent can be used to transport the received fluid or fluid in the system.

Preferably, dry reagents are provided in the structured component, which can be taken up by the flowing fluids and mixed with them.

Preferably, a reagent is provided at a defined position, which colours the fluid flowing over it and thus indicates that the position at which the reagent is present has been reached, and thus that a certain volume or dwell time has been reached.

Preferably, a magnification function is provided in the structured component at a defined position, for example in the form of a lens integrated into the structured component, in order to be able to better follow the reaching of certain positions in the channel system by the fluid and also to be able to better read colour reactions as indicator reactions.

Longer channel elements are also preferred as flow limiters in the fluid flow to enable a controlled fluid intake and fluid discharge.

In a preferred embodiment, the reagent reservoir is formed as a blister. Preferably, the reagent reservoir has a blister seat with piercing elements that pierce the fluid-tightly connected blister located above them. This embodiment can include a flap which allows a defined insertion of the flap via guide elements in the blister seat and thus a defined volume dosage. The volume dosing can also be carried out in several steps due to the particular configuration of the guide elements.

The fluid-tight closure of the fluidic interface for the fluid intake, for example via a cap, makes sense. The cap can also be equipped with a transport element, for example a mandrel or plunger, which projects into the channel and thus moves the fluid in it by means of volume displacement when the cap is placed on the fluidic interface. In addition, or alternatively, the cap can also have a flexible portion that can be pushed in or pulled out after it has been placed to move the fluid in the channel and/or channel system. When pushing, the fluid is pushed further into the channel. As the flexible portion is pulled out, fluid is moved out of the channel towards the fluidic interface. This allows small movements to be generated.

The particular advantage here is that defined fluid volumes can be discharged from the blister and this can also be done manually with high precision. In combination with a defined volume intake, an exact mixing ratio can thus be set.

In a preferred embodiment, the fluidic system has a long channel to the chamber. This long channel is particularly advantageous, as it can be used to adjust the speed of the fluid intake and to introduce reagents into the channel, which are optimally resuspended due to the long length of the channel.

In a preferred embodiment, the long channel to the chamber has additional widenings. This embodiment is particularly advantageous, as reagents can be pre-assembled in the widenings and improved mixing can be achieved through a different flow profile.

In a preferred embodiment, the fluidic system includes a cavity or detection chamber for optical readout and/or reaction which can preferably have different depths. A particular advantage here is that optical detection can be performed directly and, if the detection chamber is configured with several depths, the dynamic range can also be increased.

In a preferred embodiment, the fluidic system includes a lateral flow strip, which allows filling by the operation of the chamber. One embodiment includes a venting membrane, another one a venting channel. Particularly advantageous is the possibility of fluid intake, which can be operated manually, with the direct possibility of a read out via the lateral flow strip. Particular aeration options allow the combination of the negative pressure driven flow achieved by the chamber with the subsequent fluid movement by the suction effect of the lateral flow strip. A lateral flow strip is used for the detection of target molecules in the fluid, wherein both individual target molecules can be detected as well as different target molecules depending on the configuration of the lateral flow strip. A particular feature of the lateral flow strip is the integration of an array for parallel detection of several target molecules.

In a preferred embodiment, the fluidic system includes more than one chamber, which are connected to one another by a channel system and/or can be arranged in one or more planes. Particularly advantageous is that the flexible elements enable forwarding and reciprocating as well as active mixing by changing the chamber volumes.

In a preferred embodiment, the fluidic system includes attachments on the flexible components that are either located outside the chamber or extend into the chamber. A particularly advantage here is an exact definition of the volume to be taken in and/or discharged, which is thus independent of the force or finger size of the user even in manual operation.

In a preferred configuration, the fluidic system has reagents in the chamber. A particular advantage here is that the chamber is not only used for fluid movement, but the chamber volume can also be used directly for dissolving, reacting and mixing reagents. Dry reagents, in particular, enable the chamber to be used in a particularly advantageous way.

In a preferred embodiment, the cap for emptying the blister is directly connected to pushing elements for moving the flexible portion, if necessary, implemented integrally.

In a preferred embodiment, mixing is possible by means of moveable elements provided in the chamber, such as balls or rods, which can also be magnetic. Mixing can be additionally enhanced by structural elements in the structured component or can be performed entirely by these. A particular advantage here is that the simple configuration of the system allows particularly effective mixing in the chamber.

In a preferred embodiment, mixing takes place in the chamber by manually moving the fluidic system. A particular advantage here is that the simple configuration of the system allows manual use.

In a preferred embodiment, mixing takes place in the chamber by means of a mixing mechanism on the device side. A particular advantage here is that efficient mixing can take place.

In a preferred embodiment, the channel systems themselves include alignment marks, or alignment marks are attached next to, below or above the channel system, to allow volume indication. This marking is particularly advantageous similar to a ruler as it allows the user to read the received or discharged volume and to end or continue the intake or discharge of volumes in order to receive, discharge or move defined volumes.

In a preferred embodiment, multiple fluid intakes and/or fluid discharges are possible. A particular advantage here is that the fluidic system can be used for the multiple intakes and discharges of fluids.

In a preferred embodiment, fluidic interfaces are provided at the structured components which point in different directions, for example perpendicular to the plane of the fluidic system or leaving the fluidic system at a particular angle. A particular advantage here is that a particular geometry allows fluids to be taken in and/or discharged in particularly shaped surfaces or vessels.

Several fluidic interfaces are provided in a preferred embodiment. This is particularly advantageous, as fluids can then be discharged and received at different positions simultaneously or consecutively.

In combination with a distribution system, the intake and discharge can take place at several positions simultaneously or sequentially. If a mere distribution system is used, fluids can be discharged or taken in simultaneously via the movement of the flexible elements.

In a preferred embodiment, the intake and/or discharge of fluids is controlled via membrane valves. This is particularly advantageous, as it allows an individual fluid intake and/or fluid discharge at different fluidic interfaces to take place through the movement of the flexible elements in the chamber.

A particular embodiment is the integration of passive valves into the individual distribution channels in order to ensure uniform filling and thus uniform fluid transport and thus, for example, the discharge of the same volumes.

In a preferred embodiment, the intake and/or discharge of fluids is controlled via rotary valves. The rotary valves preferably have a rotary valve seat (28*a*) and a rotating rotary valve body (28*b*) with a connecting channel connecting the various parts of the channel system. This is particularly advantageous as it allows individual fluid intake and/or fluid discharge at different fluidic interfaces to take place through the movement of the flexible elements in the chamber.

In a preferred embodiment, the fluidic system is configured as a microfluidic system. The structured component is preferably and essentially made of plastic.

In the case of the flexible element, the entire component can, for example, be made of plastic foil. It is also possible to use a flexible plastic such silicone or TPE incorporated in the other components or a movable mechanical element made of any material.

The above-mentioned embodiments of the fluidic system may further include at least one functional element, which can be realized for example by a filter, a membrane, a frit, or a functional paper or similar elements.

The one or more functional elements may be realized by one or more filters, membranes, frits, paper or similar elements containing reagents or to which reagents are applied.

Reagents may be applied to the structured component and/or the at least one component and/or the one or more functional elements, and/or they can contain these reagents, for example in the form of arrays of identical or different agents.

The object is also solved by a fluidic system, comprising a structured component with a chamber and a channel system, the chamber and/or the channel system having at least one functional element, at least the chamber being sealed fluid-tightly with a component and being fluidically connected to the outside via the channel system and at least one fluidic interface, the component having a flexible or movable portion, which can be moved at least into a region of the chamber or beyond a plane of the chamber and by moving the flexible or movable portion fluids or gases can be taken in or discharged via the fluidic interface and/or moved in the fluidic system, the flexible or movable portion being movable manually or with an operating device, wherein it is possible to press the flexible or movable portion in or move the flexible or movable portion upwards.

The object is also solved by a fluidic system, comprising a structured component with a chamber and a channel system, the chamber and/or the channel system having at least one functional element, and the at least one functional element being provided with reagents, at least the chamber being sealed fluid-tightly with a component and being fluidically connected to the outside via the channel system and at least one fluidic interface, the component having a flexible or movable portion, which can at least be moved into a region of the chamber or beyond a plane of the chamber in order to take in or discharge fluids or gases via the fluidic interface by moving the flexible or movable portion and/or to move it in the fluidic system, the flexible or movable portion being movable manually or with an operating device, wherein it is possible to press the flexible or movable portion in or move the flexible or movable portion upwards.

The object is also solved by a fluidic system, comprising a structured component with a chamber and a channel system, wherein reagents are applied to the structured component and/or to the component sealing it and/or to the at least one functional element, wherein at least the chamber is sealed fluid-tightly with a component and is fluidically connected to the outside via the channel system and at least one fluidic interface, wherein the component has a flexible or movable portion, which can at least be moved into a region of the chamber or beyond a plane of the chamber in order to take in or discharge fluids or gases via the fluidic interface by moving the flexible or movable portion and/or to move it in the fluidic system, the flexible or movable portion being movable manually or with an operating device, wherein it is possible to press the flexible or movable portion in or move the flexible or movable portion upwards.

Preferably the functional element is realized by a filter, a membrane, a frit and/or a functional paper. All these examples of functional elements are at least partially passable for fluids, i.e. porous. They can be membranes and/or filters for size exclusion like laser structured membranes (track-etch) with exactly defined pore size, silicon screens, filter paper with a coarse-meshed net. Functional elements that use size exclusion and/or an adherence to the surface of the functional element are different elements like porous three-dimensional structures like frits, silicon membranes, silica membranes, three-dimensional aggregated particles, filter mats made of different materials, silica mats, PET filters, thin layer chromatography material or plasma/serum generation membranes, to name a few examples. All of these functional elements can be additionally provided with reagents to realize a specific binding of target molecules to these functional elements and a specific separation of target molecules from functional elements.

Preferably, a fluid is taken in via the fluidic interface, wherein the fluid is passed through or over or across the functional element. The fluid can then be discharged by pressurizing the chamber of the thumb pump.

Preferably, the fluid is taken in by capillary forces or surface tension caused by the surfaces of the channel system and/or the chamber and/or the fluidic interface.

Preferably the fluid is taken in by actuating the chamber of the thumb pump.

Preferably, the fluidic system has at least one valve, which is arranged in the channel system, wherein a defined volume can be taken in by integrating the valve.

Preferably, at least one functional element has a suction function, which drives the fluid intake. The suction function can be caused by a hygroscopic property of the materials of the functional element.

Preferably, the inlet can be closed with a cap.

Preferably, the inlet and outlet can be closed with a cap.

Preferably, the at least one functional element is configured such that only plasma or serum passes through the functional element when blood flows through it and other blood components are retained by the functional element, wherein the plasma or serum obtained can be discharged via the fluid outlet.

Preferably two functional elements are connected in series. This means that two functional elements with identical or different properties are arranged in the channel system.

Preferably, the two functional elements are connected in series, wherein first one functional element is flowed through and the fluid reaches the chamber of the thumb pump. Then the fluid inlet is closed with a cap. By moving the flexible component, the fluid reaches the second functional element and is then discharged via the fluid outlet. This means that the first functional element is arranged in the channel system in front of the chamber in the flow direction from the inlet to the outlet and the second functional element is arranged behind the chamber in the flow direction or between the chamber and the fluid outlet.

Preferably, two functional elements are connected in series, wherein first the one functional element is flowed through, and then the fluid that has flowed through penetrates the second functional element and is discharged via the fluid outlet by a movement of the movable component. After the fluid has been taken in via the fluid inlet, the inlet is closed with a cap, for example.

Preferably, at least one functional element is used to generate plasma or serum.

Preferably, the first functional element is used for the generation of plasma or serum, while the second functional element removes hemolyzed red blood cells.

Preferably, a fluid reservoir is connected to the structured component, wherein the fluid is diluted within the channel system when the fluid is discharged from the fluid reservoir.

Preferably, a fluid reservoir is connected to the structured component, wherein dilution of the fluid within the channel system takes place when fluid is discharged from the fluid reservoir, wherein a defined volume can be discharged from the fluid reservoir and added to a defined volume of the fluid which has been taken in.

Preferably, a fluid reservoir is connected to the structured component, wherein dilution takes place via the fluid discharge from the fluid reservoir and wherein a defined volume from the fluid reservoir is added to a defined volume of the fluid which has been taken in and which has already passed through the functional element. This means that in the flow direction, the first functional element is arranged after the fluid inlet to carry out a first treatment of the fluid which has been taken in, and wherein a fluid reservoir is connected to the channel system to add a defined amount of a fluid present in the fluid reservoir to the fluid which has been treated by the first functional element.

In a further preferred embodiment, a fluid can be taken in via the fluidic interface, mixed with fluid in a reaction cavity and then passed over and/or through at least one functional element, wherein target molecules of the fluid remain on the functional element and the target molecules are separated and discharged via the fluidic interface (outlet, 5.2) using fluid from the fluid reservoir.

Preferably, at least one additional fluid reservoir is fluidically connected to the functional element, which allows different fluids to flow through the functional element in order to free the functional element from unwanted components or to displace the separated target molecules.

Preferably, the separation of target molecules from the at least one functional element is caused by a temperature change.

Preferably, the fluid which has been taken in is first passed through/across a first functional element, wherein particles are retained at the first functional element. These particles are then broken down into smaller particles and supplied to the next functional element, wherein some of the smaller particles produced are retained by the functional element and can subsequently be separated again, wherein the target particles are found in a different fraction of the eluate than the undesired components to be separated or further target components.

Preferably, before the target particles are separated by washing with fluid, cleaning is carried out, wherein unwanted particles are removed from the functional element.

Preferably, the particles are cells, the step of breaking down the particles being the lysis of the cells.

Preferably, biological components such as nucleic acids, proteins, metabolites and/or antibodies are extracted, concentrated and/or purified with the fluidic system according to the invention.

Preferably, the resulting target component is then passed over/across integrated reagents such as arrays, i.e. an array of catcher molecules, to bind the target molecules/target particles to the array molecules and subsequently detect them.

Preferably, the target component obtained is detected and/or identified by the system, further preferably quantitatively detected.

Preferably, single or multiple functional elements are arranged in parallel. This means that the channel system has several parallel lines in which one or more functional elements are arranged.

Preferably, the reagents applied to the structured component, component and/or functional element show a color change upon contact with fluid, indicating a fill indicator.

These reagents are preferably located on, in or at the functional element.

The fluidic system is also called a thumb pump, because the flexible component is particularly easy to operate with the thumb.

In accordance with one aspect, there is provided a fluidic system, comprising:

- a flat structured component having a first main side and a second main side being parallel to each other, the flat structured component,
- having a chamber and a channel system and at least one functional element being configured as a filter, a membrane, a frit or a functional paper,
- wherein the chamber and the channel system are formed on the first main side in a surface of first main side of the structured component,
- wherein at least the chamber and the channel system are closed fluid-tightly with a component and are fluidically connected to an outside via the channel system and at least one fluidic interface, wherein the at least one fluidic interface is an opening of the channel system on a side surface of the structured component, the at least one fluidic interface protrudes as a projection from one side surface of the flat structured component,
- wherein the surface of the flat structured component having the channel system and the chamber formed therein is covered by the component,
- wherein the component has an externally accessible flexible or movable portion which can be moved at least into a region of the chamber or beyond a plane of the chamber, wherein by a movement of the flexible or movable portion fluids or gases can be taken in or discharged through the fluidic interface and/or moved in the fluidic system,
- wherein the flexible or movable portion can be moved manually or with an operating device and it is possible to press in or move up the flexible or movable portion.

In accordance with another aspect, there is provided a method for processing a fluid, wherein a received fluid first flows through the first functional element and the received fluid then enters the chamber, wherein thereafter the first fluidic interface is closed and by moving a flexible portion of the chamber the fluid is forced over and/or through the second functional element and discharged via the second fluidic interface.

In accordance with another aspect, there is provided a method for processing a fluid, wherein a received fluid first flows through the first functional element and the received fluid subsequently penetrates the second functional element, wherein the received fluid is discharged by means of a movement of the movable portion via the second fluidic interface.

In accordance with another aspect, there is provided a method for processing a fluid, in which a received fluid is mixed with another fluid to produce a mixed fluid in a reaction cavity, and is subsequently guided across the at least one functional element, wherein target molecules of the mixed fluid remain on the at least one functional element, wherein the target molecules are dissolved by a fluid from a fluid reservoir and are discharged via the second fluidic interface.

In accordance with another aspect, there is provided a method for processing a fluid, wherein a received fluid is first guided across the first functional element and particles are first retained on the first functional element, these particles are then broken down into smaller particles and supplied to the second functional element, wherein a part of the smaller particles is retained by the second functional element and can then be released again.

In accordance with another aspect, there is provided a method for processing a fluid, in which, before the target particles are separated from the at least one functional element by washing with fluid from a fluid reservoir, a cleaning is carried out by rinsing undesired components out of the at least one functional element and the undesired components are thus removed from the at least one functional element.

In accordance with another aspect, there is provided a method for processing a fluid, in which the fluid is subsequently guided through a reaction cavity with integrated reagents, and the reaction cavity is configured to contain a reaction therein which allows target molecules to be detected, and/or

- in which the fluid is subsequently guided across an array and a detection reaction of the target molecules with the array takes place, and/or
- in which the fluid is detected and/or identified by the fluidic system, and/or quantitatively detected.

Figure 1A:
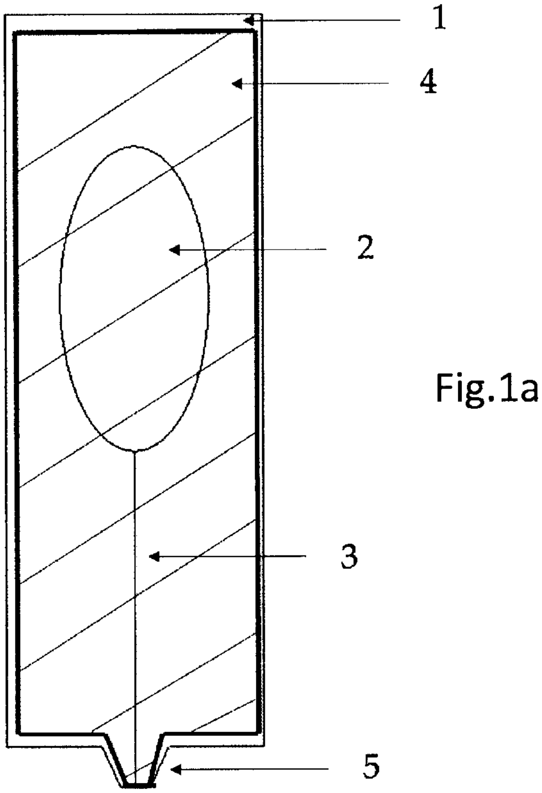
FIGS. 1-16 show basic variants of the thumb pump, which have been extended in their functionality by further elements as shown in FIGS. 17-25: In the figures.
Figure 1B:
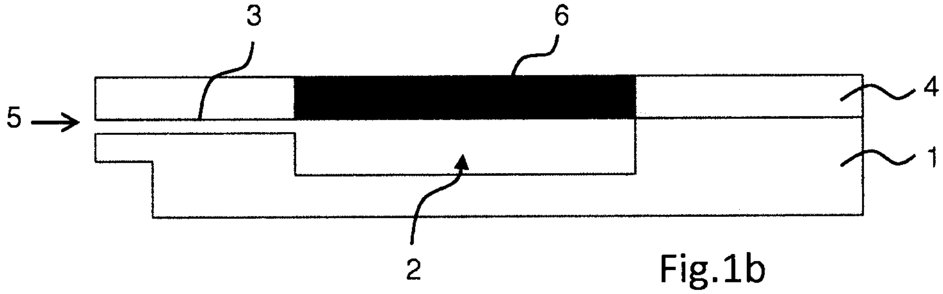
Figure 1C:
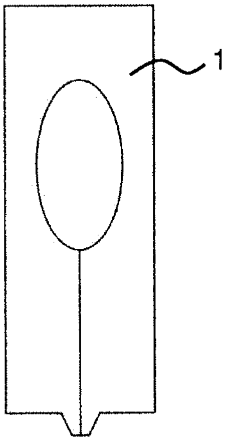
Figure 2:
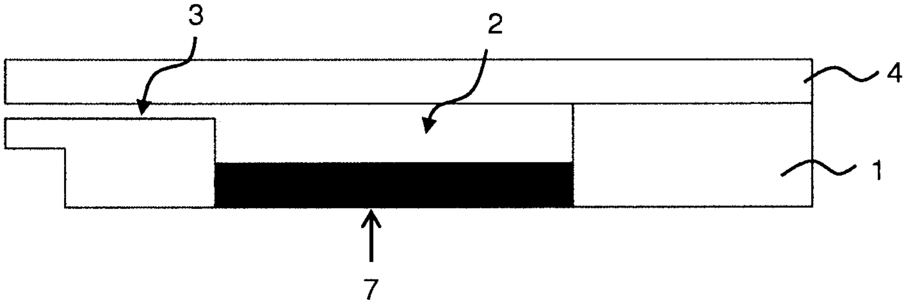
Figure 3:
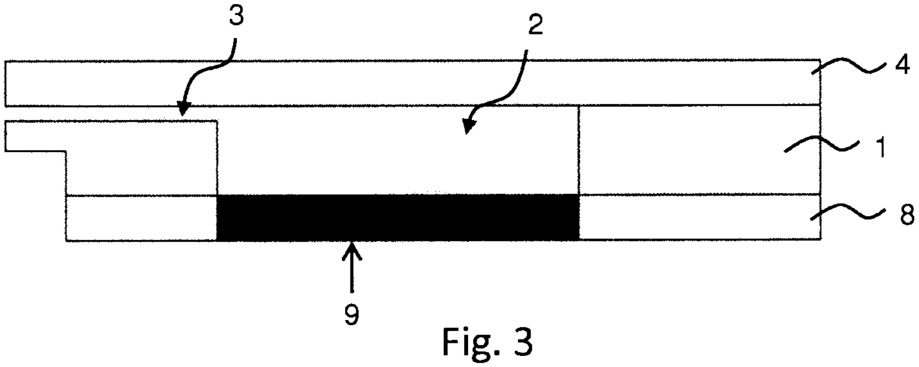
Figure 4:
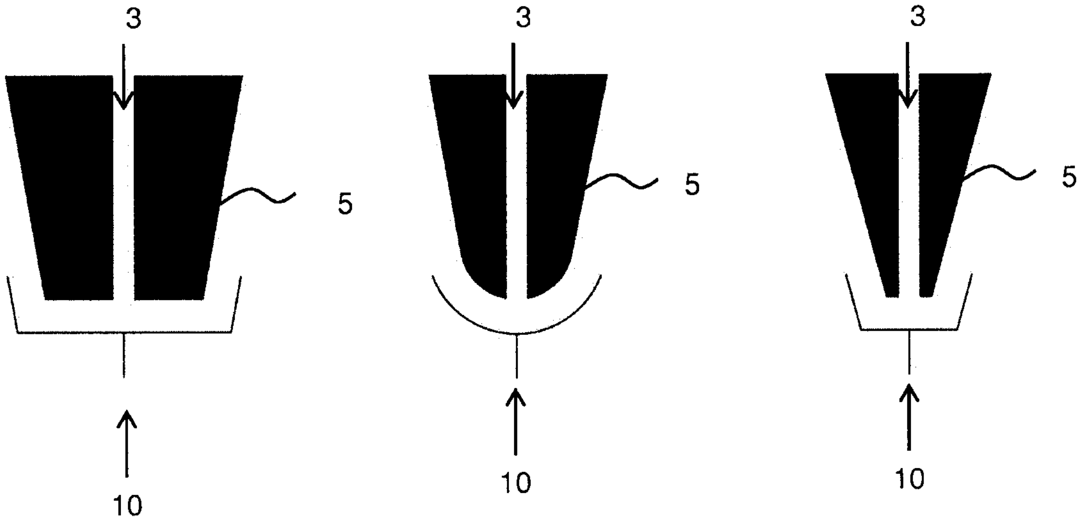
Figure 5A:
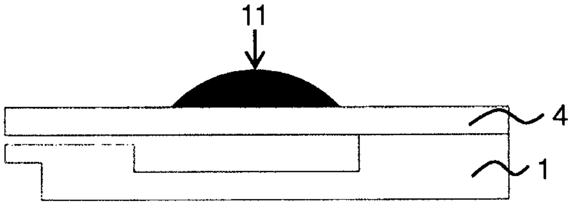
Figure 5B:
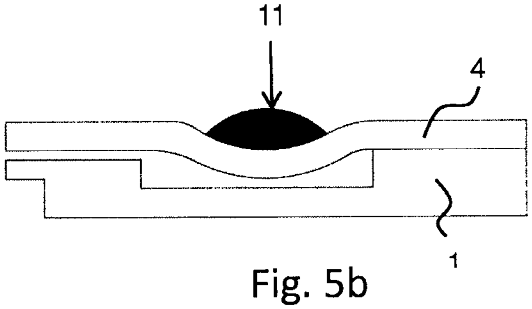
Figure 5C:
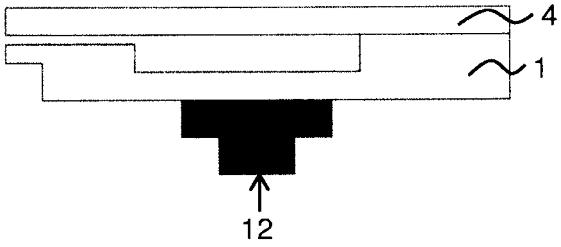
Figure 5D:
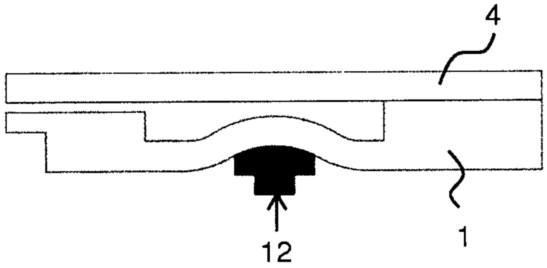
Figure 5E:
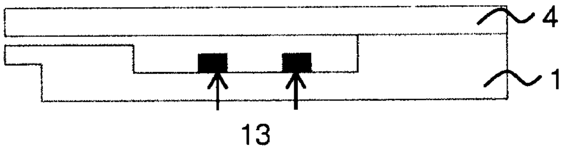
Figure 5F:
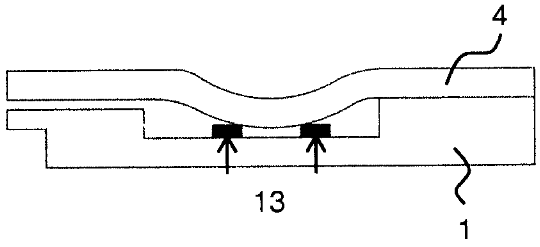
Figure 6A:
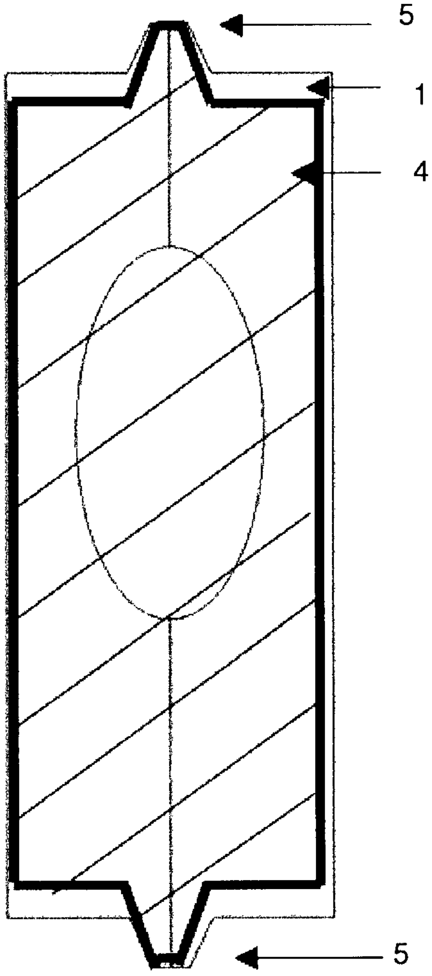
Figure 7A:
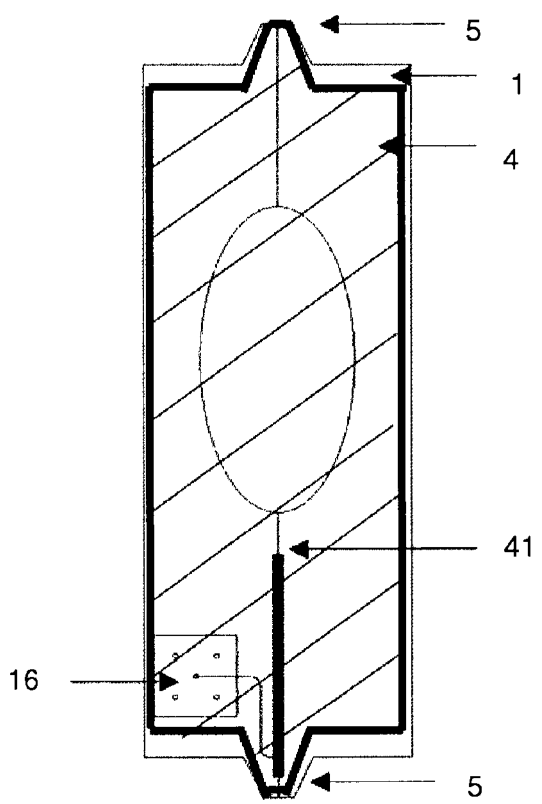
Figure 7B:
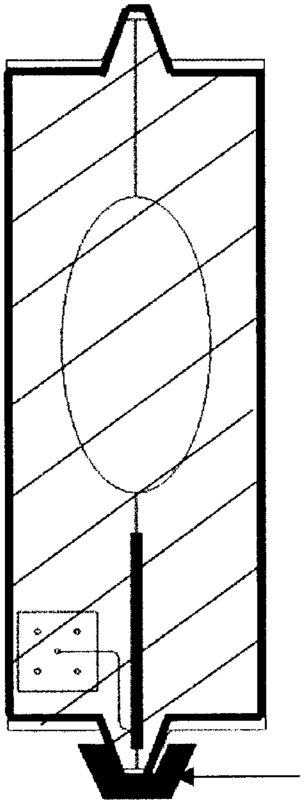
Figure 8A:
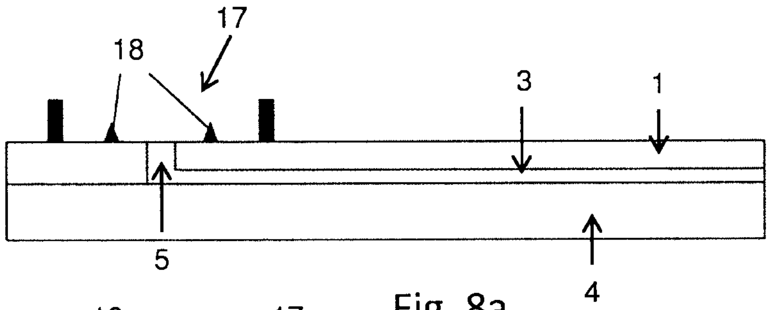
Figure 8B:
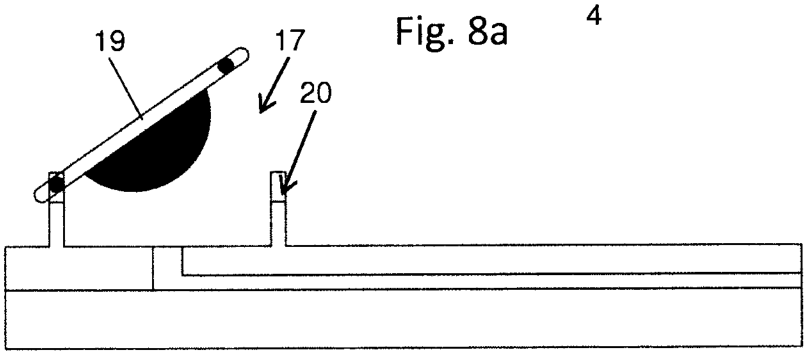
Figure 8C:
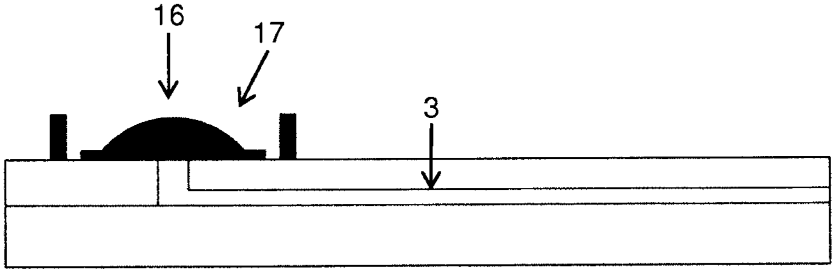
Figure 8D:
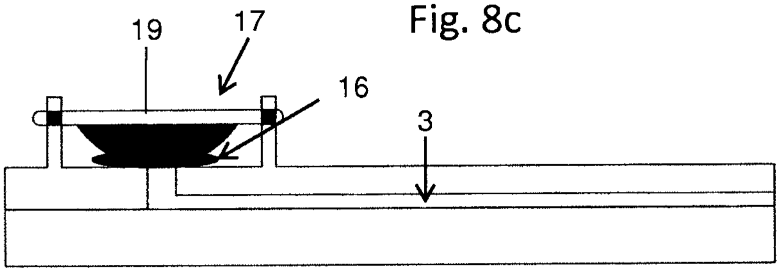
Figure 8E:
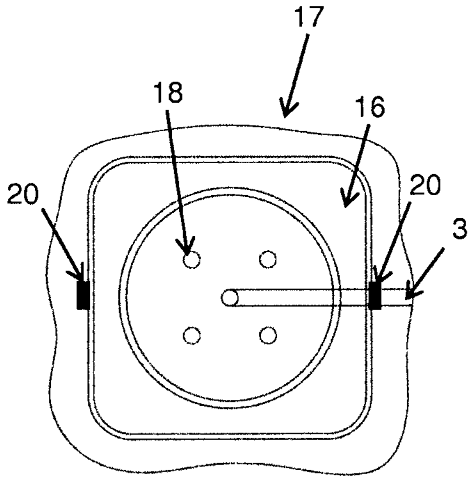
Figure 9A:
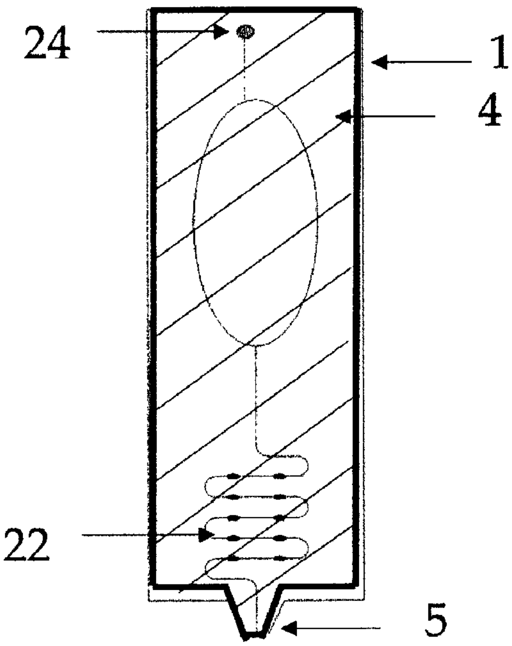
Figure 9B:
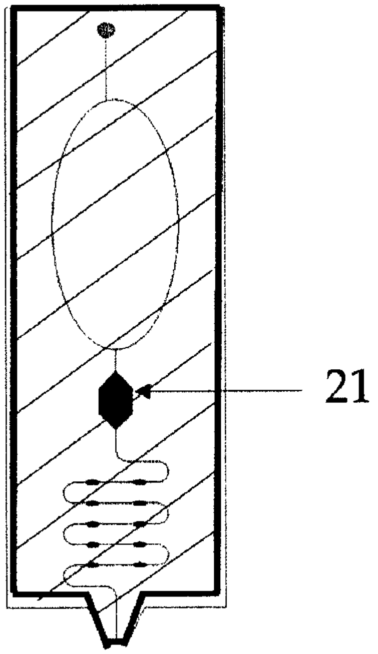
Figure 10A:
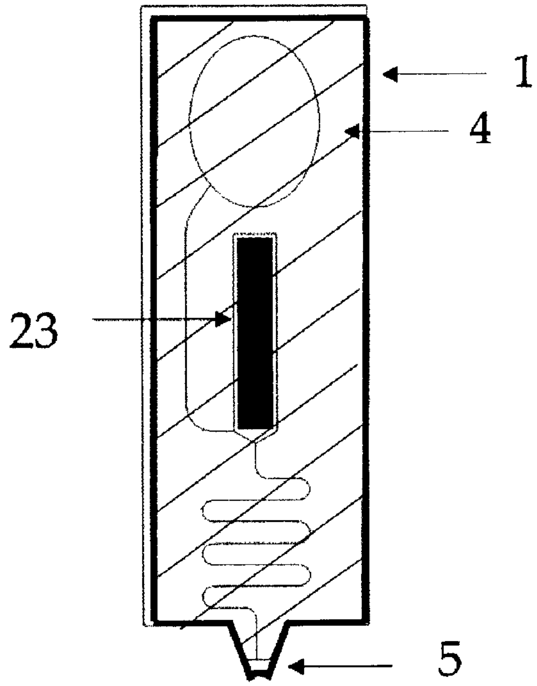
Figure 10B:
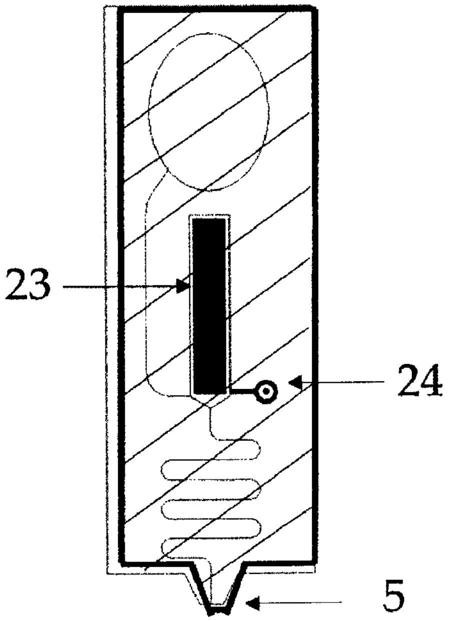
Figure 10C:
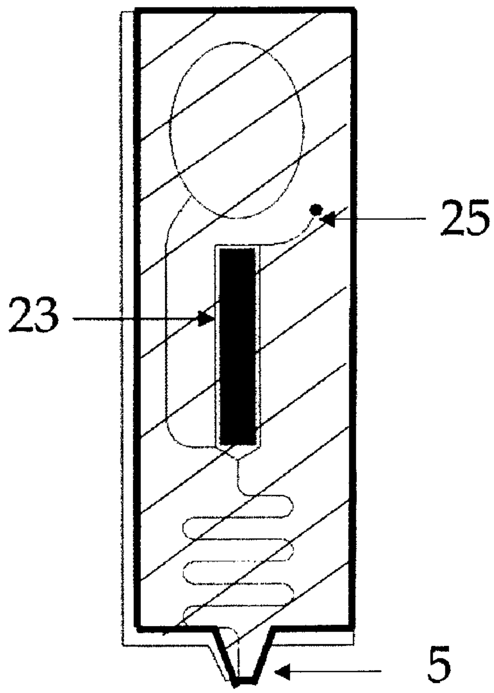
Figure 11:
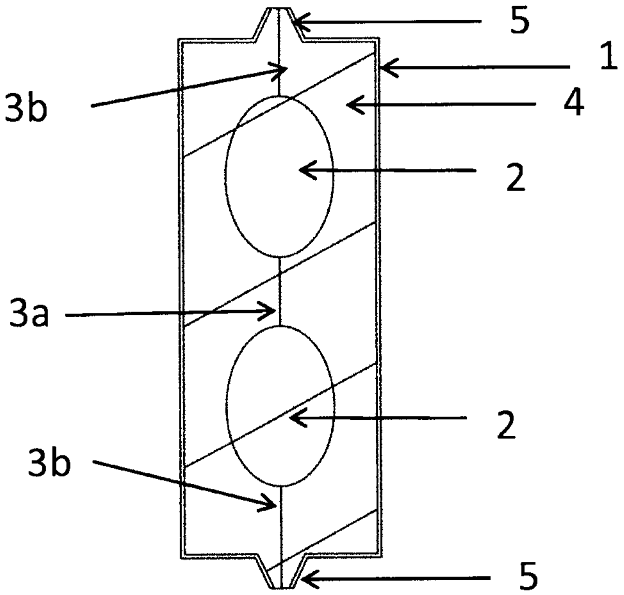
Figure 12A:
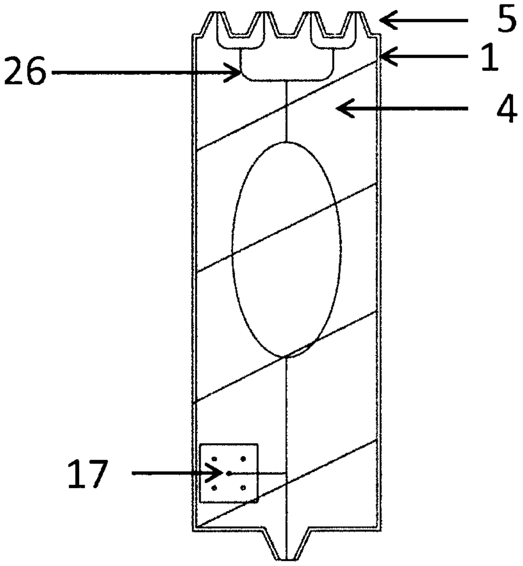
Figure 12B:
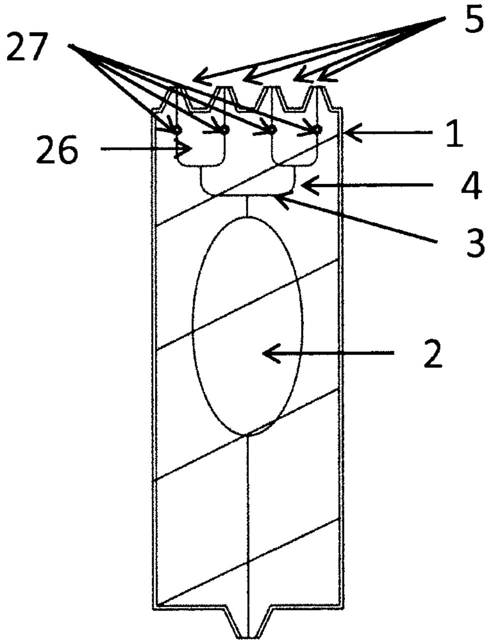
Figure 12C:
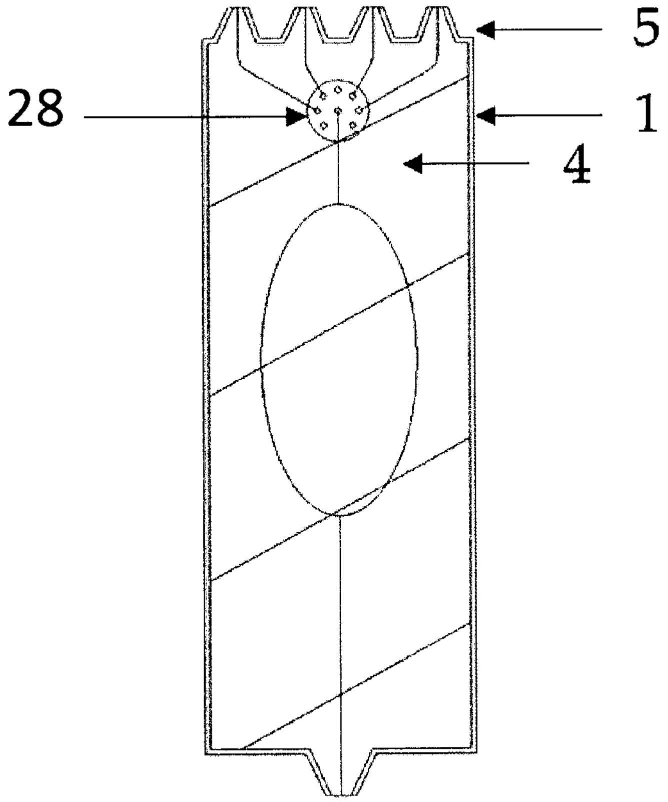
Figure 12D:
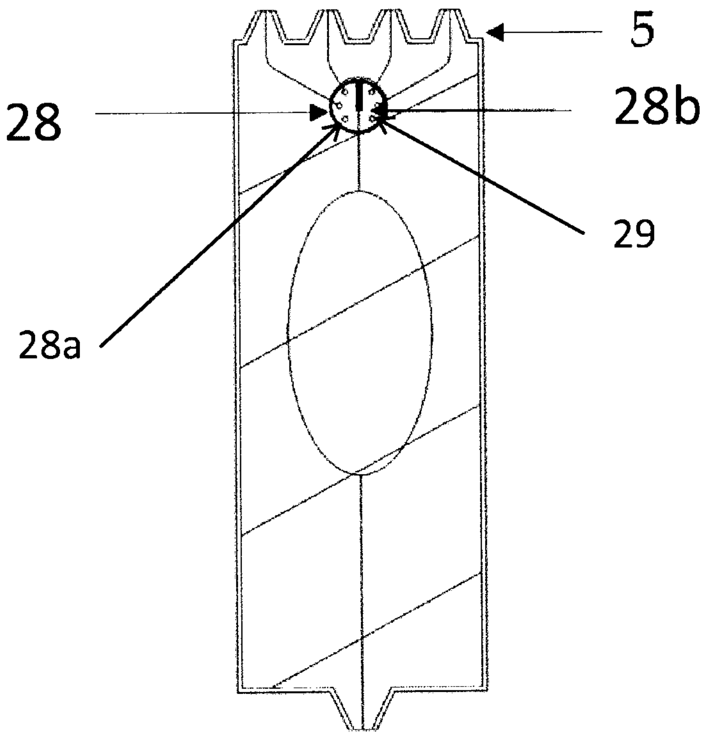
Figure 13:
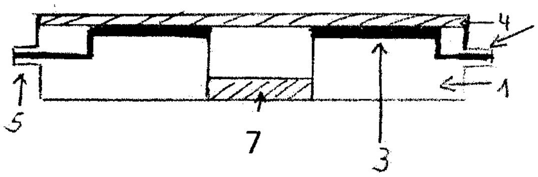
Figure 14A:
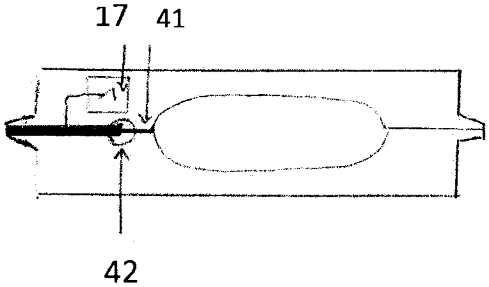
Figure 14B:
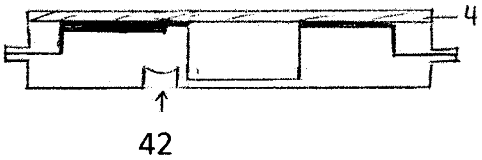
Figure 15A:
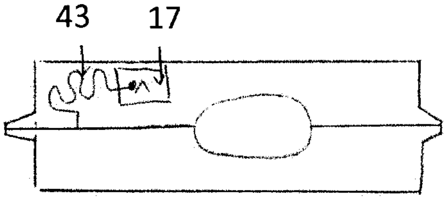
Figure 15B:
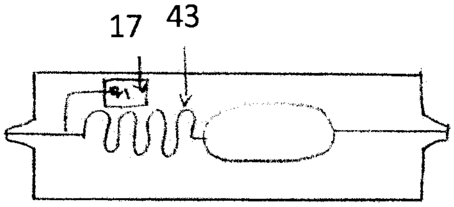
Figure 15C:
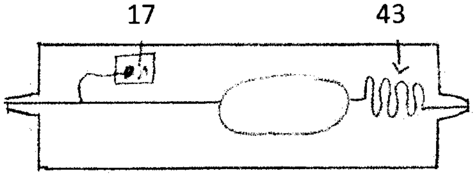
Figure 16:
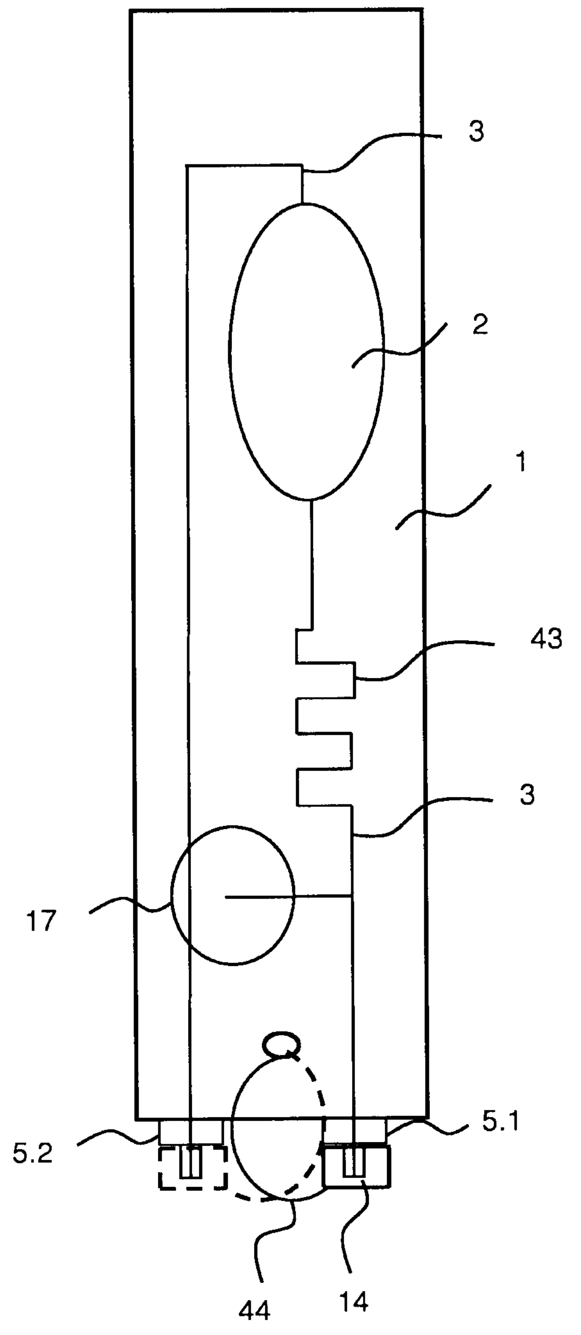
Figure 17A:
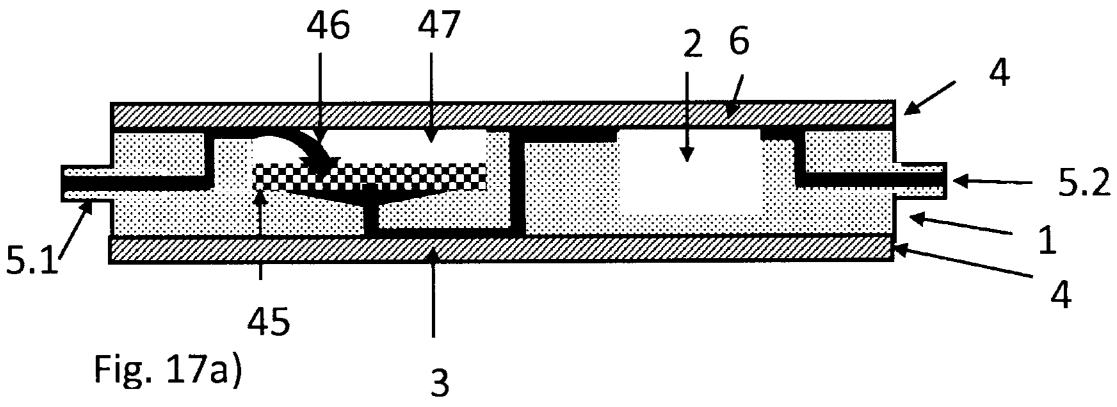
Figure 18:
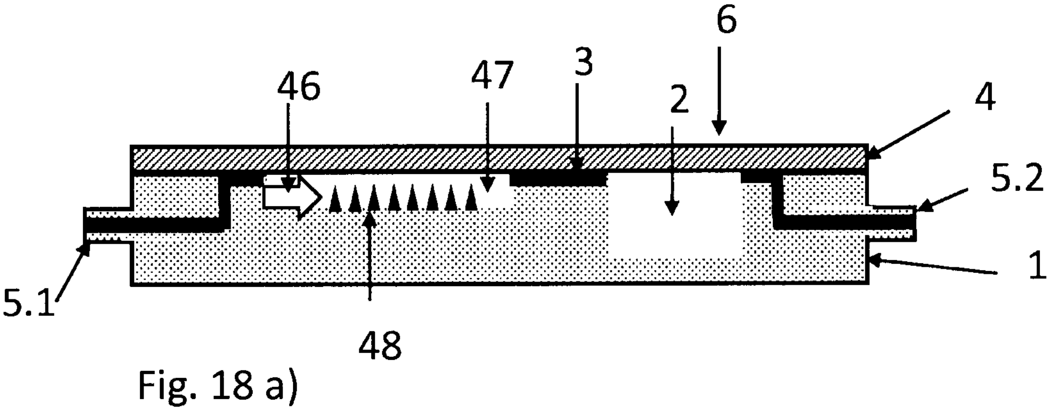
Figure 18:
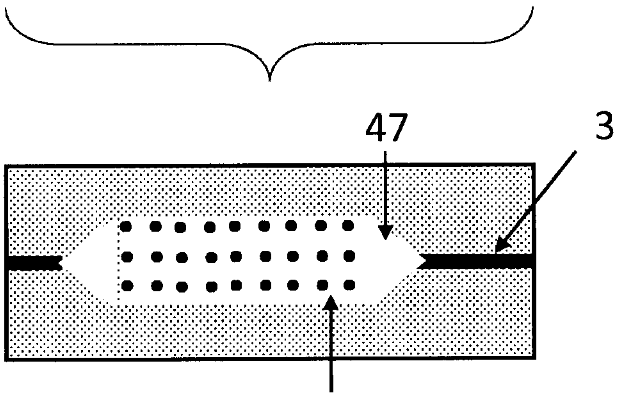
Figure 18:
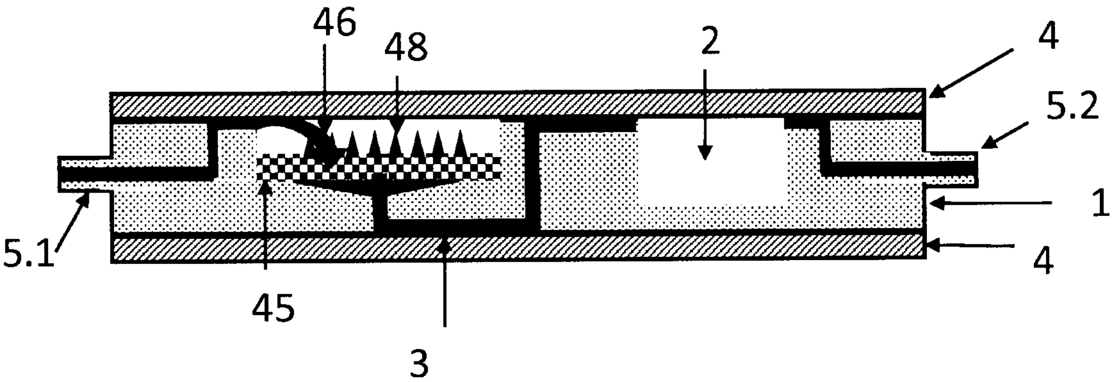
Figure 25:
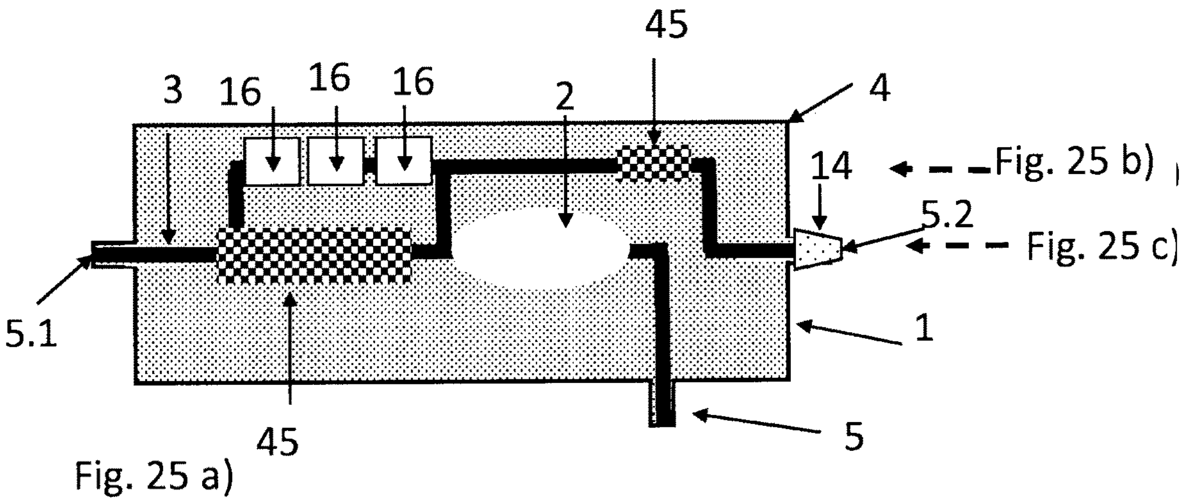
Figure 25:
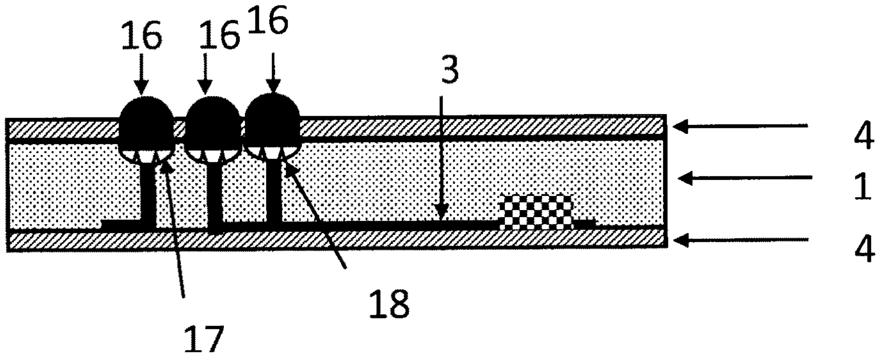
Figure 25:
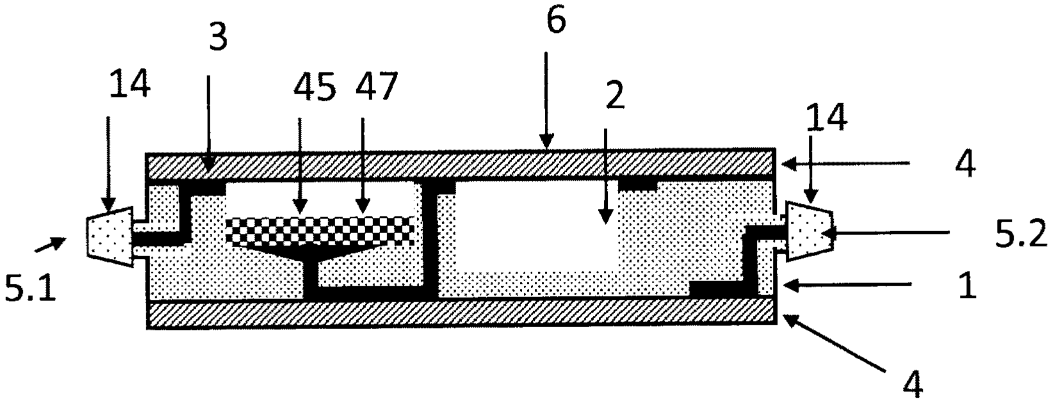
Figure 26:
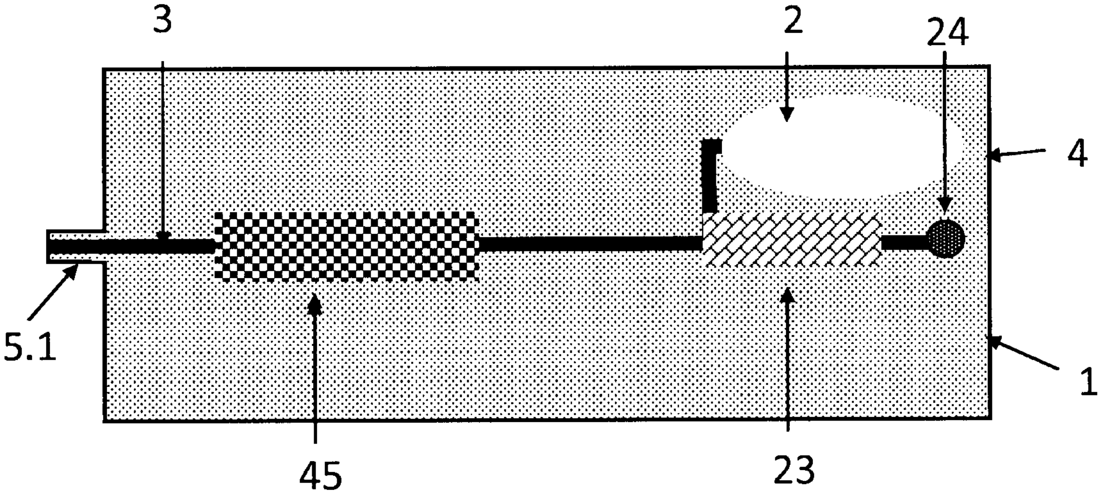
Figure 26:
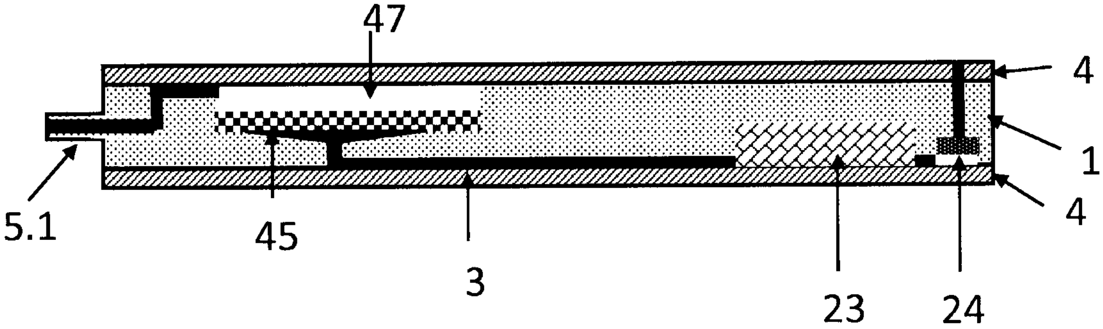
Figure 27:
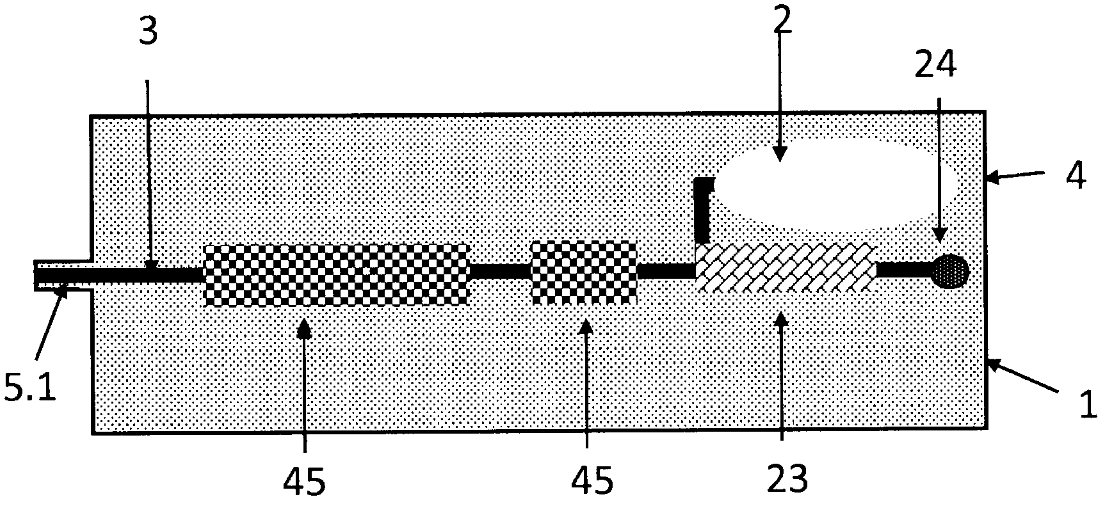
Figure 27:
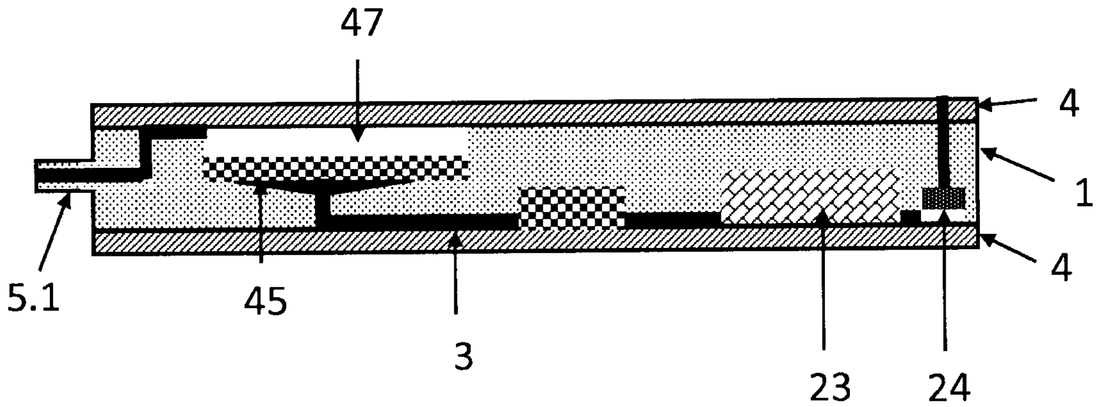

| | |
|---|---|
| FIGS. 1a to 1c | show a fluidic system according to an embodiment. |
| FIG. 2 | shows a fluidic system according to an alternative embodiment. |
| FIG. 3 | shows a fluidic system according to another alternative embodiment. |
| FIGS. 4a to 4c | show fluidic interfaces of a fluidic system according to embodiments. |
| FIG. 5a to 5f | show pushing elements of a fluidic system according to embodiments. |
| FIGS. 6a and 6f | show a fluidic system according to another embodiment. |
| FIGS. 7a and 7b | show a fluidic system according to yet another embodiment. |
| FIGS. 8a to 8e | show an ejection mechanism of a fluidic system of an embodiment. |
| FIGS. 9a and 9b | show a fluidic system having widenings and a detection chamber according to embodiments. |
| FIGS. 10a to 10c | show a fluidic system having a lateral flow strip according to embodiments. |
| FIG. 11 | shows a fluidic system according to another embodiment. |
| FIGS. 12a to 12d | show a fluidic system having a distribution system of an embodiment. |
| FIG. 13 | shows a fluidic system according to another embodiment. |
| FIGS. 14a, 14b | shows a fluidic system having a magnification device of an embodiment. |
| FIGS. 15a to 15c | show a fluidic system having flow limiters according to embodiments. |
| FIG. 16 | shows an embodiment of the chip having a cap in a plan view from above. |
| FIGS. 17a to d | show an embodiment with a functional element such as a membrane, filter, frit, paper or similar element, |
| FIGS. 18a to c | show an embodiment with integrated reagents, exemplarily drawn as an array, FIG. 18a and FIG. 18c as cross-section, FIG. 18b as top view, |
| FIGS. 11a, 19b, 19c | show an embodiment with a functional element (filter, membrane, frit, paper or similar element) upstream and downstream of the chamber, FIG. 19a as top view, FIG. 19b as cross-section and FIG. 19c as cross-section with cap, |
| FIGS. 20a, 20b, 20c | show an embodiment with two functional elements as a top view (FIG. 20a) and cross-section (FIGS. 20b, c), |
| FIGS. 21a, 21b, 21c | show an embodiment with two functional elements as a top view (FIG. 21a) and cross-section (FIGS. 21b, c), which has a fluid reservoir, |
| FIGS. 22a, 22b, 22c | show an embodiment with two functional elements as a top view (FIG. 22a) and cross-section (FIGS. 22b, 22c), a reagent reservoir and fluidic interfaces that can be closed via caps, |
| FIGS. 23a, 23b, 23c | show an embodiment with a functional element as top view (FIG. 23a) and cross-section (FIGS. 23b, 23c), a venting membrane and fluidic interfaces that can be closed with caps, |
| FIGS. 24a, 24b, 24c | show an embodiment with a functional element as top view (FIG. 24a) and cross section (FIGS. 24b, FIG. 24c), and three fluid interfaces that can be closed with caps, as well as three fluid reservoirs, |
| FIGS. 25a, 25b, 25c | show an embodiment with two functional elements as a top view (FIG. 25a) and a cross-section at the level of the fluid reservoirs (FIG. 25b) and on a cross-section at the level of the first functional element and the chamber (FIG. 25c), and three fluidic interfaces that can be closed using caps and, for example, three fluid reservoirs. |
| FIGS. 26a, 26b | show an embodiment with a functional element as a top view (FIG. 26a) and as a cross section (FIG. 26b), a fluidic interface that can be closed by a cap, a vent opening provided with a gas-permeable membrane 24 as a further fluidic interface, and a lateral flow strip 23. |
| FIGS. 27a, 27b | an embodiment with two functional elements as top view (FIG. 27a) and cross section (FIG. 27b), a fluidic interface that can be closed by a cap, a vent opening provided with a gas-permeable membrane 24 as a further fluidic interface, and a lateral flow strip 23. |
| FIGS. 28a, 28b, 28c | an embodiment with two functional elements as a top view (FIG. 28a) and cross-section (FIG. 28b, c), a fluidic interface which can be closed by a cap, a venting opening provided with a gas-permeable membrane 24 as a further fluidic interface, a lateral flow strip 23 and a reagent reservoir 16 which opens into the channel system 3 via a supply channel at any desired point, and a cavity serving as a waste reservoir 49 as a component of the channel system 3. |

DETAILED DESCRIPTION

The present invention describes a fluidic system including a chamber which has a flexible or movable part, usually the bottom or lid, in particular embodiments also movable walls, which, by lifting or bottoming, allows the intake, discharge, displacement, dilution or mixing of fluids or gases which are connected to the chamber via at least one channel or opening. An extension of the invention is achieved either by additional elements such as filters, membranes, frits or similar elements and/or integrated reagents, which may for example be arranged in the form of an array of identical or different reagents. This enables the separation, filtering, fractionation, and enrichment of fluids and their components as well as modification of fluids and their components and the detection of the components of the fluids. The individual use and combination of the additional elements can be carried out as desired.

The chamber and the movable part are configured such that, by a movement of the movable part from its initial position, a predetermined and adjustable volume of the chamber is displaced. In this way, predetermined volumes can be received or discharged in the chamber when the moving part is returned to another position or to the initial position. In other words, the volume is predetermined by the properties of the fluidic system or can be adjusted by the configuration of the fluidic system according to the invention.

FIGS. 1*a* to 1*c* show an embodiment of the fluidic system. FIG. 1*a* and FIG. 1*c* show a top view of the fluidic system, and FIG. 1*b* shows a cross-sectional view of the fluidic system.

The fluidic system has a structured component 1 including a chamber 2, wherein the chamber 2 is connected to a channel system 3. The structured component 1 is essentially flat and/or plate-like. In other words, the structured component 1 has a first main side and a second main side which are parallel to each other. The chamber 2 and the channel system 3 are formed on the first main side on and/or in the surface of the structured component 1. In other words, the chamber 2 and the channel system 3 are embedded at the main side into the surface of the structured component 1. The chamber 2 and the channel system 3 thus are a recess on the surface of the structured component 1. For example, the first main side is a top side of the structured component 1, and the second main side is a bottom side of the structured component 1, wherein an orientation of the top side and the bottom side is arbitrary and by turning the structured component the top side becomes the bottom side and vice versa. Side surfaces of the structured component 1 are arranged between the top side and the bottom side of the structured component 1. The structured component 1 can, for example, be rectangular in shape. The structured component 1 can also be disc shaped. However, the structured component 1 can take on any shape as long as it is essentially flat. The structured component 1 can be formed as a platform, for example. Structured component 1 can be flat.

The chamber 2 and/or the channel system 3 thus has a top side which corresponds to the top side of the structured component 1. A bottom side of the chamber 2 and/or the channel system 3 is formed inside the structured component 1. The bottom side of the chamber 2 can also be referred to as a chamber bottom 7. The interior of the chamber 2 is formed between the top side of the chamber 2 and the bottom side, wherein the top side and bottom sides can be either the top or bottom side, depending on an orientation.

The chamber 2 and/or the channel system 3 can be configured as a recess in the structured component 1, for example on the top side or the bottom side of the structured component 1. The chamber 2 and the channel system 3 can be configured as recesses of different depths, wherein the top side and bottom sides can be either the top or bottom side, depending on an orientation.

The chamber 2 and/or the channel system 3 are fluidically connected to the outside via one or more fluidic interfaces 5. In other words, the fluidic interface 5 is an opening of the channel system 3 e.g. on a side surface of the structured component 1. The opening of the fluidic interface 5 can also be arranged on an upper side or bottom side of the fluidic system. As can be seen in FIG. 1*a*, the structured interface 5 can protrude as a projection from one side surface of the structured component 1. In this case it is possible with the fluidic system to take in fluid directly from a fluid surface, for example fluid located in a container open at the top, by immersing the projection in the fluid and moving the flexible and/or movable part.

The fluidic system may have a plurality of fluidic interfaces 5, each of which is connected to the channel system 3. The fluidic interfaces 5 can be arranged at different surfaces of the structured component 1, for example the top side, bottom side or side surfaces, preferably on opposite side surfaces. In other words, the openings of the fluidic interfaces 5 may point in different directions. They can therefore have different orientations with respect to the center of the structured component 1.

A component 4 seals the channel system 3 and the chamber 2 fluid- and optionally gas-tight, so that the supply and discharge of fluids and gases can only take place via the one or more fluidic interfaces 5. In other words, the component 4 is arranged at the surface of the structured component 1 in such a way that it closes the chamber 2 and the channel system 3 on the upper side of the structured component 1. Component 4 can, for example, be glued, bonded, pressed, or welded to structured component 1 or sealed using sealing elements such as sealing soft components. Component 4 thus serves as a lid to seal the structured component 1.

In other words, at the top side of the chamber 2, the interior of the chamber 2 is bounded by the bottom side of the component 4. Component 4 can be essentially made of a transparent material to observe the course of the fluids in the channel system 3 and/or in the chamber 2.

Chamber 2 can have an essentially flat oval, rectangular or round shape. Thus, chamber 2 and/or the interior or volume of chamber 2 is defined by the structured component 1 on the one hand and by component 4 on the other hand.

Either the whole component 4 is flexible or the component 4 has a flexible or movable portion 6. As shown in FIG. 1*b*, the flexible portion 6 of the component 4 is located above the chamber 2 as a direct part of the component 4. Alternatively, the flexible or movable portion 6 can be configured as an additional part of the fluidic system. The flexible and/or movable portion 6 of the component 4 should be arranged at least at one portion of the chamber 2 and/or the outside of the chamber 2.

Component 4 can be for example a foil or strip and can be made of plastic or metal.

Alternative embodiments of the fluidic system are shown in FIG. 2 and FIG. 3. In accordance with the alternative embodiment shown in FIG. 2, the structured component 1 has a flexible portion 7 below the chamber 2. In other words, the flexible portion 7 is located between the chamber bottom and the bottom side of the structured component 1. The flexible portion 7 can be realized either by mounting or attaching the component for the flexible portion 7 in or on the structured component 1. The flexible portion 7 can also be implemented as a partial material property of the structured component 1 itself or by manufacturing it from more than one material, e.g. by multi-component injection molding.

Another alternative embodiment is shown in FIG. 3. According to the further alternative embodiment, the structured component 1 is closed with the component 4 and furthermore with a further component 8, wherein one or both of the components 4 and 8 can have a flexible or movable portion 9. In other words, the component 4 is arranged on the top side of the structured component 1. This means that the upper side of the chamber 2 is closed with the component 4. On the bottom side of the structured component 1 the further component 8 is arranged. This means that the bottom side of the chamber 2, i.e. the chamber bottom, is closed with the further component 8. As shown in FIG. 3, a flexible portion 9 is provided in the further component 8. Again, top side and bottom side can be both top side and bottom side, depending on the orientation.

The structured component 1 is preferably configured with a cover foil, which has sufficient flexibility for pushing in and lifting above and/or below the chamber 2.

Preferably, the chamber 2 is configured in such a way that the flexible portion(s) 6, 7, 9 do not fill the entire chamber 2 when pushing into the chamber 2. In other words, if the flexible portion 6, 7, 9 is pressed into the chamber 2, the flexible portion will not be flush with the chamber bottom. This means that fluid or gas in the chamber 2 is not completely discharged from the chamber 2 by pushing in the flexible portion 6, 7, 9. Furthermore, a tight sealing of the flexible portions 6, 7, 9 with the chamber bottom or the adjacent channel systems 3 is not necessary for the functionality, but the movement of the flexible portions 6, 7, 9 causes the movement of the medium.

An exemplary operation of the embodiment shown in FIGS. 1A to 1C is described below:

Fluid intake: In order to take fluids/gases into the fluidic system, or more precisely into the chamber 2 of the fluidic system, the flexible portion 6 is pushed downwards from the initial position manually and/or by hand, for example with a finger of a user, or by means of an operating device. In other words, the flexible portion 6 is moved from its initial position into the chamber 2 by pressure. This means that the flexible portion 6 is pushed from the top side into the interior of the chamber 2. By pushing the flexible portion 6 into the chamber 2, the interior space of the chamber 2 is reduced. Subsequently, the fluidic interface 5 is immersed in a fluid. The flexible portion 6 moves either automatically, due to the material properties of the flexible portion 6, partially or completely back to the initial position, or is moved back to the initial position by a movement of the operating device, for example suction or lifting off. In other words, the interior of the chamber 2 is enlarged again by moving the flexible portion 6 back to its initial position. By increasing the volume of the interior space, a negative pressure is created in the chamber 2 and/or in the adjacent channel system 3, which is connected to the fluid via the fluidic interface. This means that fluid is drawn into the fluidic system by the under pressure. In other words, a part of the fluid is first drawn into the channel system 3 by the negative pressure and then, if the negative pressure is sufficiently high, also into the chamber 2. Fluid is thus taken into the fluidic system. By adjusting the volume of the interior of the chamber 2 displaced by pressing down the flexible portion 6 and/or by returning the flexible portion 6 to its initial position in a defined manner, the volume of the received fluid and/or the positioning of the fluid in the channel system 3 and/or in the chamber 2 of the fluidic system can be adjusted.

Mixing fluids: The received fluid is mixed by first drawing fluid into the chamber 2, that means fluid is first taken into the fluidic system. Then either the flexible component 6 is moved or the fluidic system itself is moved. The fluidic system is moved, for example, by tilting the fluidic system several times. A fast shaking should be avoided to avoid the generation of air bubbles in the received fluid. The movement mixes the fluids in the fluidic system.

Discharge of fluids: Fluids are discharged from the fluidic system by pushing the flexible component 6 and/or the flexible components into the chamber 2. In other words, the volume or the interior of the chamber 2, which is bounded by the flexible component, is reduced by pushing the flexible component. The fluid, which is either in the chamber 2 or in the channel system 3, is discharged from the fluidic system according to the volume displaced by the movement of the flexible portion 6, i.e. by pressing the flexible portion 6 into the chamber 2. This means that the displaced fluid is discharged from the chamber 2 via the channel system 3 through the fluidic interface 5. The volume of the fluid discharged may correspond to the volume of the interior of the chamber 2 by which the chamber 2 is shrunk by pushing in the flexible portion 6. In this case, fluid volumes can be discharged several times. Multiple discharging can be achieved by pushing the flexible portion 6, 7, 9 step by step further into the chamber 2 and/or the interior of the chamber 2. Multiple discharging can also be achieved by first pressing the flexible portion 6, 7, 9 into the chamber 2 once and then moving the flexible portion 6, 7, 9 out of the chamber 2 by itself or by moving it out of the chamber 2 with the aid of an operating device as described above. The outward movement is accompanied by a backflow of at least part of the fluid in the channel system 3 connected to the chamber 2. The outward movement is followed by a repeated push of the flexible portion 6, 7, 9 into the chamber 2 for another fluid discharge. In other words, by repeatedly and alternately pushing into the chamber 2 and moving out of the chamber 2 of the flexible portion 6, 7, 9, a pumping movement and/or pumping functionality is performed. This leads to a repeated and alternating fluid intake and fluid discharge.

Closure of the fluidic interface 5 for sampling: A cap 14 closes the fluidic interface 5 for sampling. The cap 14 may also have integral projections that protrude into the channel system 3 when the cap is placed on the fluidic interface 5. This allows fluid in the channel system 3 to be displaced and forced into the rest of the channel system 3.

Preferably, one fluidic interface 5 is configured as an inlet 5.1 of the fluidic system, and another fluidic interface 5 is configured as an outlet 5.2 of the fluidic system. The inlet 5.1, and the outlet 5.2 are preferably formed at the structured components 1. The two fluidic interfaces 5.1 and 5.2 are formed on one side, preferably at an end face or narrow side of the chip (fluidic system). This means that the inlet and the outlet are arranged on one side of the system. This makes it possible to close the inlet and outlet with a cap 14, also known as a jumper.

The cap 14 is preferably attached to the fluidic system, preferably to the structured component 1. One or more caps 14 may be attached.

In a preferred configuration, only one cap 14 is provided, which can be attached to either the inlet 5.1 or the outlet 5.2. This can then be used to selectively take in fluid at the inlet or discharge fluid at the outlet.

The one or more caps 14 are attached to the chip (fluidic system) by a flap 44.

Addition of fluid: The complete or partial emptying of a fluid reservoir 16 transports the collected sample through a fluid and allows dilution or addition of reagents.

The flexible portion 6 can thus be pushed below a plane defined by the top side of the structured component 1 into the chamber 2, or more precisely into the interior of the chamber 2, by external pressure due to its flexibility. On the other hand, the flexible portion 6 can be pulled out of the interior of the chamber 2 again by pulling from the outside, for example by means of a negative pressure or an attached device. This means that it can be moved beyond the plane defined by the top side of the structured component 1.

From these basic functionalities, i.e. the intake of fluid into the fluidic system, the discharge of fluid from the fluidic system and the mixing of fluid in the fluidic system, the following characteristics result for the fluidic system:

The intake, dilution, discharge, dosing and/or transport of fluids is possible. Fluid that has been taken into the fluidic system can be transported and stored using the fluidic system. A multiple intake and multiple discharge of fluids is possible. Mixing of fluids is possible.

The fluidic system can be used as a pipette with functions of fluid intake, fluid discharge and multiple intake and discharge of fluids, due to the configuration of the fluidic system according to the above-described embodiments and by the configuration of the chamber 2 and the flexible portion 6, 7, 9. The pipette can be operated completely manually without any further aids or by means of an operating device.

FIG. 4 shows an embodiment of the fluidic interface 5. The embodiments of the fluidic interface 5 according to FIG. 4 differ in their geometry. More precisely, the embodiments of the fluidic interface 5 each have an outlet 10, wherein the shape of the outlet 10 differs in the embodiments shown here. By the particular and/or defined geometry of the outlet and/or by a surface modification and/or a material characteristic of the outlet 10 of the fluidic interface it can be adjusted, at which volume of a drop of the discharged fluid the drop separates from the outlet. By the defined geometry of the outlet 10 of the fluidic interface 5, volumes, i.e. desired volumes, of the fluid drop of the discharged fluid can be pre-set. This means that the geometry of the outlet 10 of the fluidic interface 5 is also decisive for the volume of the discharged fluid. In other words, when fluid is to be discharged from the fluidic system, the flexible portion 6, 7, 9 is pushed into chamber 2 so that a drop of fluid forms at the outlet 10 of the fluidic interface 5. The flexible portion 6, 7, 9 is pushed further into the chamber 2 until the drop of fluid separates from outlet 10. Then the pushing-in of the flexible portion 6, 7, 9 and/or the discharging of fluid can be stopped. Alternatively, the flexible portion 6, 7, 9 can be pushed further into the chamber 2 to create another drop of fluid.

FIGS. 5*a* to 5*f* show pushing elements of the flexible portions according to different embodiments. The flexible portions 6, 7, 9 can have pushing elements 11, 12, 13 in order to allow a defined pushing of the flexible portions 6, 7, 9 into the chamber 2 and/or a defined pulling out and/or moving out of the flexible portions 6, 7, 9 from the chamber 2. In other words, in order to prevent differences due to a person-dependent application of force or finger size when operated manually or by hand, pushing elements 11, 12, 13 can be arranged or applied on the flexible portions 6, 7, 9. The pushing elements 11, 12, 13 can be used to ensure that by pressing the pushing portion 6, 7, 9 into the chamber 2 the same volume of the interior of the chamber 2 is always displaced. The pushing elements 11, 12, 13 can be operated either manually and/or by hand, for example with a finger, or by an operating device. The pushing elements 11, 12, 13 can be materials applied to the flexible portion 6. For example, the pushing elements 11 can be configured as a silicone hemisphere, as shown in FIGS. 5*a* and 5*b*. Alternatively, the pushing elements 12 can be manufactured directly with a flexible portion 8, for example by multi-component injection moulding, as shown in FIGS. 5*b* and 5*c*. Alternatively, a defined pushing can also be provided using pushing elements 13, which are provided as protruding elements in the structured component, as shown in FIGS. 5*e* and 5*f*. The pushing elements 13 shown in FIGS. 5*e* and 5*f* are arranged in the chamber 2 of the fluidic system, for example on the chamber bottom, and protrude into the interior of the chamber 2. By means of the pushing elements 13, the movement of the flexible portion 6 can be limited when pushing into the chamber 2, so that only a predetermined maximum volume of the interior is displaced. FIGS. 5*a*, 5*c*, and 5*e* each show the initial state of the flexible portion 6, 7, 9, i.e. the state when no force and/or pressure is applied to the flexible portion 6, 7, 9. FIGS. 5*b*, 5*d* and 5*f* each show a position prior to a fluid intake and/or during fluid discharge, i.e. a position of the flexible portion 6, 7, 9 when it is pushed into the chamber 2.

Figure 6B:
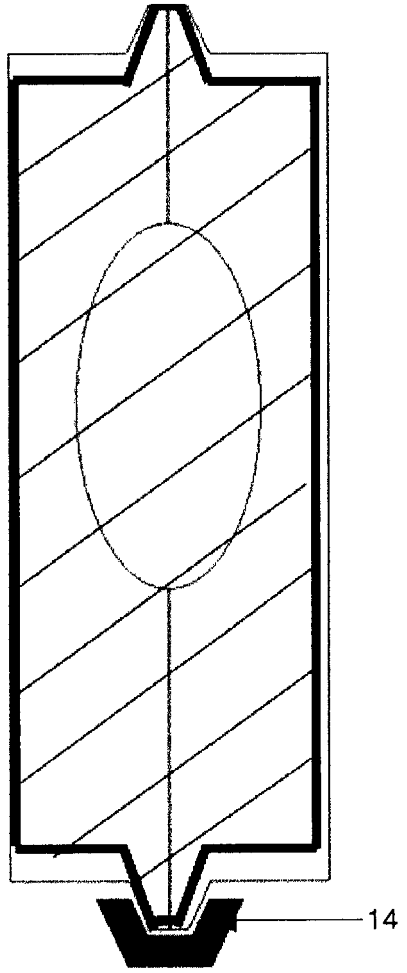

FIGS. 6*a* and 6*b* show further embodiments of the fluidic system, in which two separate fluidic interfaces 5 are arranged. As shown in FIGS. 6*a* and 6*b*, the fluidic interfaces 5 are arranged on different, more precisely opposite side surfaces of the structured component 1 and protrude from the respective side surfaces. Here the fluid intake can be performed by one of the two fluidic interfaces 5, and the fluid can be discharged by the other of the two fluidic interfaces 5. As shown in FIG. 6*b*, the fluidic interfaces 5 can also be closed by one or more caps 14 to prevent contamination or leakage of fluid from the fluidic interface 5. Only one cap 14 is shown in FIG. 6*b*. The cap 14 allows the fluid received in the fluidic system to be transported and stored particularly safely and easily. In other words, the caps 14 can be placed on the fluidic interface 5, or more precisely, on the openings formed by the fluidic interface 5 on the respective side surface of the structured component 1 and seal the fluidic interfaces 5 fluid-tight.

As shown in FIGS. 7*a* and 7*b*, the fluidic system can include a fluid reservoir 16. The fluid reservoir 16 is connected to the channel system 3 and/or the chamber 2 via a channel. The channel can be part of the channel system 3. The fluid reservoirs 16 can, for example, be formed by one or more so-called blisters, i.e. compartments filled with fluid, for example openable by piercing, which are mounted fluid-tight on the fluid system. Fluid intake from the blister is achieved by pressing out the blister itself, i.e. with positive pressure or by pressing down the flexible portion 6 as described above and moving the flexible portion 6 out of chamber 2, wherein the resulting pressure in the chamber 2 and the channel system 3 allows to take in fluid from the fluid reservoir into the channel system 3 and/or chamber 2 via the connected channel. A leakage of fluid from the fluidic interface 5 is prevented by placing a cap 14 on the fluidic interface, such that further fluid due to the emptying of the fluid reservoir 16 urges the fluid in the channel system 3 into the chamber 2 and the fluid from the fluid reservoir 16 also flows into the chamber 2. In other words, fluid taken into the fluidic system from the outside and located in the channel system 3 and/or the chamber 2 can be mixed with the fluid in the fluid reservoir 16. Mixing can be facilitated and/or intensified by placing cap 14 on the fluidic interface, since with cap 14 on, the negative pressure created by moving the flexible portion 6 acts on the fluid in the fluid reservoir 16. The fluid reservoir 16 can also be referred to as a reagent reservoir or fluid reagent reservoir, and can contain any type of fluid. In a preferred embodiment, these reagent reservoirs can also contain gases.

The fluids can be mixed by moving the fluidic system, moving the flexible portion 6, 7, 9, or by inserting mixing elements. The mixing elements, for example balls made of silicone, hard plastic balls, metallic components or other particles, can be moved by manual movement of the fluidic system. Alternatively, or additionally, the mixing can be carried out by means of mixing elements made of magnetic materials, which are moved from the outside by a device for mixing.

FIGS. 7*a* and 7*b* show an embodiment of the fluidic system which combines two types of fluid intake. On the one hand, for example, the sample intake is carried out via the fluidic interface 5, which serves as the fluid inlet, by moving the flexible portion 6, 7, 8 of the chamber 2 into the chamber 2 and moving out the flexible portion as described above. Alternatively, an independent fluid intake into the fluidic system can be carried out via passive filling, i.e. by means of capillary forces or special surface properties of the channel system at the fluidic interface 5. The suction effect caused by the negative pressure and/or the capillary forces, and thus the filling speed, can be increased and/or accelerated by a surface modification, for example hydrophilization of the channel surface of the channel system 3.

Furthermore, the volume of the received fluid can be determined by means of passive valves in channel system 3, for example capillary stop valves and channel tapers 41, see FIG. 7*a*, of channel system 3. A defined quantity of fluid is thus taken in, wherein a sealing cap 14 prevents the fluid from escaping when the fluid reservoir 16 is emptied.

FIGS. 8*a* to 8*e* show an ejection mechanism for the fluid reservoir 16 according to an embodiment. For example, the ejection mechanism may be formed as a flap 19, wherein the latching of the flap 19, as shown in FIG. 8*d*, causes the insertion of a defined amount of fluid from the fluid reservoir 16 into the channel system 3 of the fluidic system, thereby achieving a defined mixing ratio of the fluid from the fluid reservoir with the fluid (sample) received in the fluidic system. FIG. 8*d* shows a state in which the flap 19 presses the fluid reservoir 16 (blister) onto the fluidic interface 5 of the channel of the channel system 3. This principle can be extended to further fluid reservoirs 16 and can therefore be used for multiple mixtures.

FIG. 8*a* shows an ejection mechanism with a seat 17, which can be configured as a blister seat and has piercing elements 18, for example small tips. The piercing elements 18 are only shown in FIG. 8*a*.

FIG. 8*b* shows an embodiment of an ejection mechanism, wherein the seat 17 has latching lugs 20 and the flap 19 is mounted in a hinge-like manner on the latching lugs 20 of the seat 17. As shown in FIG. 8*b*, the fluid reservoir 16 is arranged at the flap 19. The ejection mechanism shown in FIG. 8*b* may also have a piercing 18 (not shown). One of the latching lugs 20 serves as hinge and another one of the latching lugs 20 serves as latching surface and/or seating surface for the flap 19 in order to limit a rotation of the flap 19. This means that when the flap 19 is closed, the fluid reservoir 16 is pierced and the fluid from the fluid reservoir can be introduced into the channel system 3 of the fluidic system. By limiting the rotation of the flap 19 by the latching lugs 20, a defined and/or predetermined amount of fluid can be discharged from the fluid reservoir to the fluidic system. The seat 17 can also be referred to as reservoir interface.

FIG. 8*c* shows an embodiment of the ejection mechanism in which the fluid reservoir 16 is located on the surface of the structured component 1. In this case, the flap 19 may have a bulge and/or projection as shown in FIG. 8*d*, so that the fluid reservoir 16 is squeezed by the projection when the flap 19 is closed. FIG. 8*d* shows the closed ejection mechanism, in this case the flap 19.

FIG. 8*e* is a top view of an ejection mechanism with seat 17 according to an embodiment.

FIGS. 9*a* and 9*b* show a fluidic system with a long channel system 3. As shown in FIGS. 9*a* and 9*b*, the channel system 3 meanders between the fluidic interface 5 and the chamber 2, increasing the length of the channel system 3. This creates a dwell distance for the fluid received in the fluidic system. The dwell distance can be filled with reagents such as dried reagents. This allows a long channel system 3 to be formed. The channel system 3 can also have widenings 22 for better mixing, as shown in FIG. 9*a*, or another passive mixing element. As shown, the widenings can be formed elongated and/or in the direction of flow in the channel system 3. Fluid and/or reagents can be introduced into the widenings 22 which is/are mixed with fluid taken into the channel system 3 and/or the fluidic system and/or discharged from the fluidic system. The channel system 3 may also have an optical detection chamber or reaction chamber 22, 21 as shown in FIG. 9*b*. A particular advantage is the configuration of the detection chamber 21 in different depths in order to extend the dynamic range of the measurement. In other words, the detection chamber 21 can be embedded to different depths in the structured component 1, so that, for example, it has step-like detection chamber bottoms of different depths.

A further option for extending the chamber functionality is the insertion of a lateral flow strip 23, as shown in FIGS. 10*a* to 10*c*, which can be filled in a defined manner using the pump function of the fluidic system and/or fills itself after wetting with fluid via capillary forces. Thus, a combination of filling by the pumping action of the chamber 2 in manual operation as described above and/or by means of an operating device and the suction action of the lateral flow strip can also be carried out. As shown in FIGS. 10*a* to 10*c*, the lateral flow strip is inserted and/or embedded into another chamber, which is also connected to the channel system 3. The use of ventilation channels 25 or gas-permeable and fluid-tight membranes 24, each connected to the channel system 3 and/or the chamber of the lateral flow strip, to operate the system is particularly advantageous. This is shown, for example, for the gas-permeable and fluid-tight membranes 24 in FIG. 10*b* and for the ventilation channels 25 in FIG. 10*c*.

FIG. 11 shows a fluidic system according to a yet further embodiment. As shown in FIG. 11, the structured component 1 has two chambers 2 which are embedded in the upper side of the structured component. The two chambers 2 are directly connected to each other via a first channel system 3*a* and/or a channel 3*a*. The two chambers 2 are also each connected to a fluidic interface 5 via a respective second channel system 3*b* and/or channel 3*b*. This embodiment of the fluidic system can also be referred to as a combined chamber system. The use of combined chamber systems, which can then be used simultaneously as mixing, reaction, pump and/or dosing units, is a further embodiment of the fluidic system.

FIGS. 12*a* to 12*d* show embodiments of the fluidic system with distribution systems 26. As shown in FIGS. 12*a* to 12*d*, a chamber 2 is connected at one end to a distribution system 26. Distribution system 26 can be part of the channel system 3. The distribution system 26 has one or more channels leading away from the chamber 2 and branching from each other. The ends of the respective branched channels of the distribution system 26 are each connected to a fluidic interface 5. As shown in the embodiments of the fluidic system of FIGS. 12*a* to 12*d*, a respective channel leads away from the chamber 2 and branches into four channels, each of which is connected to a respective fluidic interface. By moving the flexible portion 6, 7, 9 and the associated change of the chamber volume, the distribution systems allow a simultaneous or successive fluid intake and/or fluid discharge.

FIGS. 12*a* and 12*b* show a fluidic system including a distribution system 26, wherein the channel leading away from the chamber 2 branches step by step, namely first into two further channels. The two further channels then branch into two further channels, so that the channel leading away from the chamber 2 branches into a total of four channels, which lead into the respective multiple fluidic interfaces 5. In FIG. 12*a* all fluidic interfaces 5 are simultaneously controlled by a movement of the flexible portion 6, 7, 9.

As shown in FIG. 12*b*, the branched channels of the distribution system 26 can have membrane valves 27. The use of membrane valves 27 requires the membrane valves 27 to be pressed in and the membrane valves 27 to be sealed fluid-tight in order to close the respective channels individually or together and thus to be able to implement the fluid intake and/or fluid discharge via the fluidic interfaces 5. In other words, the membrane valves 27 can be used to control the flow of fluid within the respective channels in a targeted and defined manner. This means that the individual fluidic interfaces 5 can be systematically controlled by means of the membrane valves 27. This means that they can be controlled independently of each other. The membrane valves 27 can be brought or controlled in a state which does not allow any fluid flow in the respective channel, a state which allows an approximately undisturbed fluid flow in the respective channel and/or a state which allows a reduced fluid flow in the respective channel. Thus, a defined and/or simultaneous fluid intake and/or fluid discharge can be systematically controlled via the respective fluidic interfaces 5.

FIGS. 12*c* and 12*d* show an embodiment of the fluidic system including a distribution system 26, in which the channel leading away from the chamber 2 branches at one point in a star shape into four further channels. As shown in FIG. 12*c*, a rotary valve 28 can be arranged at the branching point, which can be operated from the outside either manually or by means of a device. With the help of the rotary valve 28, a defined fluid flow can thus be connected between the channel leading away from the chamber 2 and one or more channels connected to the branched channels, i.e. to the fluidic interfaces 5. The body of the rotary valve 28 may itself have one or more embedded channels 29 which, when positioned on the point of branching which may form the seat 28*a* of the rotary valve 28, connect the branched and/or connected channels. Depending on the configuration of a distribution channel 29 integrated in the rotary valve body 28*b*, the option with a rotary valve 28 permits sequential or parallel fluid intake and/or fluid discharge via one or more fluidic interfaces 5, which in turn is controlled by changing the chamber volume. It is also possible to combine one or more membrane valves 27 and/or rotary valves 28 in one fluidic system. This means that the individual fluidic interfaces 5 can also be systematically controlled by means of the rotary valves 28. This means that they can be controlled independently from one another.

In general, the following applies to the fluidic system according to the present invention: all processes described for the use of fluids are equivalent to gases and a combination of fluid and gaseous substances is also possible with this fluidic system, for example the systematic supply of gases to fluids.

A further embodiment form is shown in FIG. 13. Here, the structured component 1 has a flexible portion 7 below the chamber 2, which is realized either by the application of another component into the structured component 1 or directly by the material property of the structured component 1 itself or by the manufacturing from more than one material, for example by multi-component injection moulding.

A further embodiment is shown in FIGS. 14*a* and 14*b* as a plan view and as a section view, respectively, wherein at a defined position above or below the chamber 2 and/or the channel system 3 a magnification function component 42 is provided in the structured component 1, which is configured for example in the form of a lens in order to be able to better follow the reaching of certain positions in the channel system 3 by the fluid and also to be able to better read colour reactions as indicator reactions.

A further embodiment is shown in FIGS. 15*a* to 15*c*, wherein longer channel elements are provided in the fluid flow in the channel system 3 as flow limiters 43, in order to enable controlled fluid intake and discharge. The flow limiters 43 are formed in a meander shape and/or are configured as channel tapering to control the flow of a fluid and/or limit the velocity.

As shown in FIGS. 6*a* to 7*b* and FIGS. 9*a* and 15*c*, according to all of these embodiments the chamber 2 can be connected to several channels and/or the channel systems 3, each of which leads to at least one fluidic interface 5. The fluidic system can therefore have a plurality of fluidic interfaces 5 and the chamber 2 can have several outgoing channels and/or channel systems 3.

FIG. 16 shows an embodiment of the fluidic system (chip) in a view from above. It shows the structured component 1 with a chamber 2 and the channel system 3. The channel system 3 connects the inlet 5.1, with the chamber 2 and connects the chamber with the outlet 5.2.

A flow restrictor 43 is integrated in the channel system 3 upstream of chamber 2, which is meander-shaped and/or can include channel tapers 41 (not shown here), with which the flow velocity of the fluid can be controlled and/or reduced. A reservoir interface 17 with a fluid reservoir is connected to the channel system 3.

The inlet 5.1 and the outlet 5.2 can be closed with a cap 14, which is attached to the chip by a flap 44. Preferably, only one cap 14 is provided, which can be fitted alternately on the inlet 5.1 or the outlet 5.2 to selectively enable the chip to receive fluids when the inlet 5.1 is open, i.e. without the cap 14, and the outlet 5.2 is closed with a cap 14. Thus, a required negative pressure can be built up to take in a fluid via the fluidic interface 5.1 (inlet). After the intake and corresponding analysis in the chip, the fluid should be discharged again. To this end, the cap 14 is placed on the inlet 5.1 and the inlet 5.1 is sealed fluid-tight. The fluid can then be discharged via the outlet 5.2. Thus, the cap 14 can be used to switch between two functions of the chip.

In a further configuration, it is possible to attach several caps 14 to the chip, for example to allow the chip to be transported or stored, wherein either the inside of the chip is protected from contamination and/or leakage of fluids present inside is prevented.

A fluidic system is provided, comprising a structured component 1 having a chamber 2 and a channel system 3, wherein at least the chamber 2 is closed in a fluid-tight manner by a component 4 and is fluidically connected to the outside via the channel system 3 and a fluidic interface 5, wherein the component 4 has a flexible or movable portion 6 which can be moved at least into a portion of the chamber 2 or beyond a plane of the chamber 2, wherein by a movement of the flexible or movable portion 6 fluids or gases can be taken in or discharged through the fluidic interface 5 and/or moved in the fluidic system, and wherein the flexible or movable portion 6 is movable by hand or with an operating device, and a pushing or an elevating of the flexible or movable portion 6 is possible.

A fluidic system is provided, comprising a flat structured component 1 with a chamber 2 and a channel system 3, wherein at least the chamber 2 is closed fluid-tightly with at least one component 4, wherein the chamber 2 is fluidically connected to the outside via a channel system 3 and at least one fluidic interface 5, wherein the component 4 and/or the structured component 1 has a flexible or movable portion 6, which at least partially adjoins the chamber 2, wherein the flexible or movable portion 6 is configured to be pressed into or moved out of the chamber 2 manually or with an operating device so that fluids or gases are taken into or discharged via the at least one fluidic interface 5 and/or moved in the fluidic system.

A fluidic system may comprise a structured component 1 having a chamber 2 and a channel system 3, wherein the chamber 2 and the channel system 3 are closed in a fluid-tight manner by a component 4, wherein the chamber 2 is fluidically connected to the outside via the channel system 3 and the fluidic interface 5, and wherein the structured component 1 has a flexible or movable portion 6 forming side walls of said chamber 2.

A fluidic system may comprise a structured component 1 having a chamber 2 and a channel system 3, a component 4 which closes the chamber 2 and the channel system 3 in a fluid-tight manner, wherein the chamber 2 is connected to the outside via the channel system 3 and a fluidic interface 5, and wherein the structured component 1 is configured such that a bottom of the chamber 7 is flexibly configured and pressable.

Preferably, the flexible or movable portion 6 is formed on at least one side wall of the chamber 2 within the structured component 1.

In these embodiments of the fluidic system, the chamber 2 can be connected to another fluidic interface 5, preferably via a further channel system 3. Preferably at least one of the fluidic interfaces 5 can be closed with a cap 14.

The fluidic system may further comprise a venting device for the chamber 2, wherein the venting device is arranged such that venting can take place via an additional channel 25 connected to the outside or a gas-permeable membrane 24.

The fluidic system may further comprise an inlet channel which has a passive stopping function and is filled either by capillary action or by a change in the chamber volume caused by the flexible or movable components and takes in a defined quantity of fluid.

The fluidic system may also include an additional reagent reservoir 16. The additional reagent reservoir can be configured as a blister 16.

The reagent reservoir 16 may include a blister seat 17 having piercing elements 18 adapted to pierce the blister 16 fluid-tightly connected above the piercing elements 18, a flap 19, which is pushable in a defined manner using guide elements 20 in the blister seat 17, wherein a defined volume dosage is possible.

Preferably, a channel 3 leading to the chamber 2 can have widenings or expansions 22.

Preferably, a cavity or detection chamber 21 for optical readout and/or reaction observation can be connected to the channel system 3, preferably having different depths. The outwardly facing surface of the cavity can be transparent to allow a reaction of the fluid by the incident light and/or an optical readout of the reaction or constituents present in the detection chamber 21.

The component 4 and/or the structured component 1 can be transparent at least in some areas. This allows observation of the movement of the fluid within the channel system 3. Depending on the analyses to be performed, the component 4 and/or the structured component 1 can also be opaque at least in some areas to prevent a reaction of the fluid with the incident light.

Preferably, the fluidic system may have a lateral flow strip 23, the filling of which is made possible by an operation of the chamber 2, wherein a venting membrane 24 and/or a venting channel 25 is connected to the lateral flow strip 23.

Preferably, the fluidic system can have at least two chambers 2, wherein the at least two chambers 2 are directly connected to each other via a channel system 3*a*.

Preferably, the fluidic system may have attachments 11, 12, 13 on the flexible or movable component 6, which are either located outside the chamber 2 or extend into the chamber 2.

Preferably, the chamber 2 may contain reagents.

Preferably, the fluidic system may include movable elements introduced into the chamber 2 for mixing. Preferably, mixing of fluids takes place within the chamber 2 by a manual movement of the fluidic system and/or by a mixing device.

The channel system 3 may have alignment marks, which are arranged next to, below or above the channel system 3, and which enable a volume indication.

With the fluidic system it is possible to perform multiple fluid intake and/or fluid discharge.

Preferably, there may be several fluidic interfaces 5 pointing in different directions or arranged on different sides of the fluidic system or leaving the fluidic system at a predetermined angle.

Preferably, the fluidic system may have a rotary valve 28, which can be used to control the intake and/or discharge of fluids.

Preferably, the fluidic system may have one or more membrane valves 27 connected to the channel system 3, with which the intake and/or discharge of fluids can be controlled.

The fluidic system may preferably have a passive stop function, which is configured as a capillary stop valve, a channel tapering and/or a surface modification.

Preferably, the reagent reservoir 16 may have guide elements 20, which allow multi-stage volume dosing.

Preferably, the fluidic system may have a cap as a fluid-tight seal of the fluidic interface 5.

Preferably, the cap 14 may have a flexible portion that is configured to be pushed in or pulled out after it is placed on the fluidic interface, thereby moving the fluid in the channel system 3.

Preferably, the gas-permeable membrane and/or the venting device is configured to be closeable.

Preferably, the at least two chambers 2 are arranged in one and/or several planes.

The movable mixing elements are preferably configured as balls or rods.

Preferably, the fluidic system includes structural elements in the chamber 2 and/or in the channel system 3 to enhance mixing.

Preferably, the fluidic interface 5 has an outlet 10, wherein the volume of a discharged fluid drop is determined by means of a geometry of the outlet 10.

The fluidic system may have a plurality of fluidic interfaces 5, which are connected to a distribution system 26 in the structured component 1, wherein the plurality of fluidic interfaces 5 can be selectively controlled.

Preferably, the channel system 3 and/or the fluidic interface 5 is configured in such a way that an autonomous fluid intake into the fluidic system takes place by means of the capillary forces of the channel system 3 at the fluidic interface 5.

Preferably, the fluidic system may have an inlet 5.1 and an outlet 5.2 located on one side of the system, with a cap 14 attached to the fluidic system, preferably to the structured component 1, which can be fitted to either the inlet 5.1 or the outlet 5.2 to allow a fluid to be taken in at the inlet 5.1 or discharged at the outlet 5.2.

Preferably, the fluidic system may have a reservoir interface 17, by means of which a fluid reservoir 16 can be connected to the structured component 1. The reservoir interface 17 can be fluidically connected to the channel system 3 and/or to the chamber 2.

The channel system 3 can have valves, which allow the intake of defined volumes of fluid. The valve function can be created and/or enhanced by surface functionalization.

Dry reagents are preferably arranged or stored in the channel system 3, wherein the dry reagents are taken in by the flowing fluids and mixed with them.

Preferably, a reagent is placed at a defined position in or on the channel system 3 and colors fluid flowing over it, so that reaching a position and thus reaching a certain volume or a defined dwell time is indicated.

Preferably, a magnifying device is arranged at at least one defined position above or below the channel system 3 or the chamber 2 so that reaching at least one defined position in the channel system 3 can be detected by fluid and/or by a color reaction. The magnifying device can be configured as a lens.

The fluidic system may preferably have extended channel elements as flow limiters 43, which are inserted into the fluid flow of the channel system 3 to enable controlled fluid intake and discharge.

The reservoir interface 17 can include a flap 19 to allow defined volumes to be extracted from the blister 16.

Preferably, geometric elements or attachments 11, 12, 13 are provided to enable a defined movement of the flexible portion 6, 7, 9.

The flap 19 and the geometric elements or attachments 11, 12 configured as pressure elements are preferably connected, combined and/or coupled with each other on the flexible or movable portion 6, 7, 9.

A multi-channel distribution system 26 may be provided, which opens into a corresponding number of fluidic interfaces 5 to allow simultaneous intake and discharge of fluids.

Equal distribution of fluids in the distribution system 26 can be supported by integrated passive valves 27.

The channel system 3 and/or the distribution system 26 connected thereto may have one or more valves 27, 28 to allow a defined fluid delivery from individual fluid interfaces 5.

The fluidic interface 5 can passively absorb fluid without moving the flexible or movable portion 6, 7, 9.

The above-mentioned embodiments can have one or more functional elements. This results in the following embodiments:

- additional functional elements such as filters, membranes, frits, paper or similar elements, functional elements such as filters, membranes, frits, paper or similar elements which are provided with reactants, or
- by certain reagents applied to the structured component or the sealing component 4, in particular in the form of arrays of identical or different agents, or by any combination of the embodiments mentioned under a-c.

The one or more functional elements 45 such as filters, membranes, frits, paper or similar elements are located in or on the structured component.

These functional elements 45 can be attached in such a way that they are flooded vertically (FIG. 17*a*) or horizontally (FIG. 17*c*) by the penetration of fluids or gases.

Figure 17:
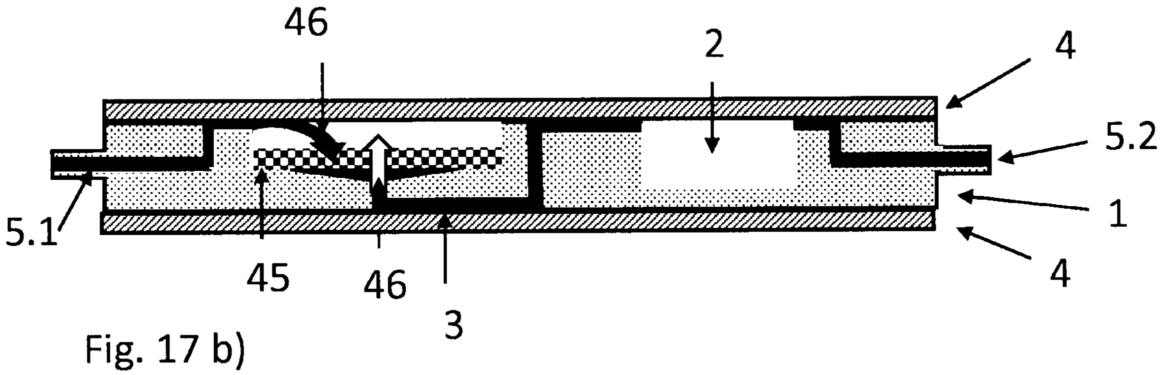
Figure 17:
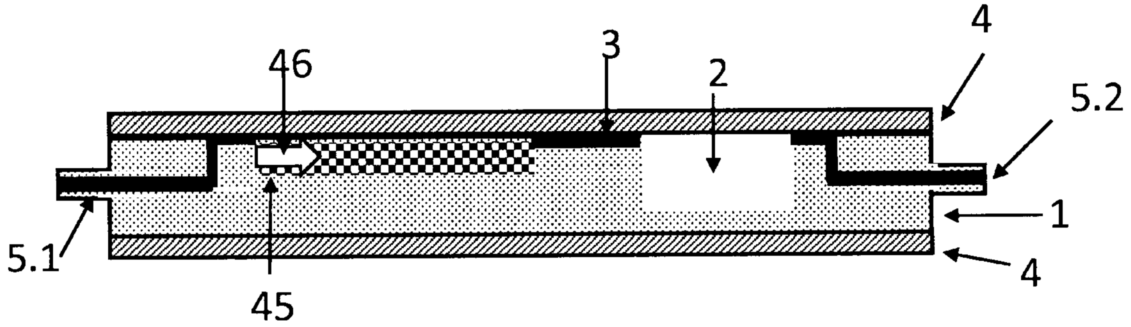
Figure 17:
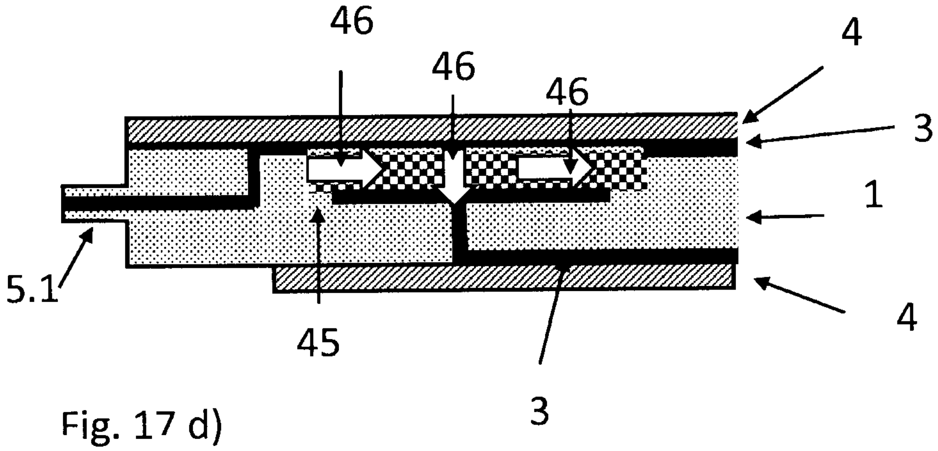

FIG. 17 includes FIGS. 17*a*, 17*b* and 17*c*, in which a fluidic system is shown in a sectional view. The fluidic system has two fluidic interfaces 5.1 and 5.2, which are also called fluidic inlet or fluidic outlet. The fluidic system has a structured component 1 with a chamber 2 and a channel system 3. The channel system 3 can run on the bottom and/or top side of the structured component 1, wherein the channel sections on the bottom and/or top side of the structured component 1 are connected to each other by means of drill holes or openings. In this embodiment, the structured component 1 is covered by two components 4 on the bottom and on the top side. In addition to chamber 2, the structured component 1 has a reaction cavity or cavity 47 in which a functional element 45, in particular a membrane 45, is inserted, which is arranged in such a way that a fluid that is introduced into the channel system 3 from the inlet 5.1 can pass through the membrane 45. A cavity 47 is provided above the membrane 45. After passing through the membrane 45, the fluid enters chamber 2, which can create a vacuum by actuating the flexible portion 6 to suck in the fluid, move it through the membrane 45, and discharge it through the outlet 5.2. FIG. 17*a* shows a vertical flow through membrane 45 or functional element 45 in only one direction (flow direction 46).

FIG. 17*b*, on the other hand, indicates that, by actuating the flexible portion 6, fluid in channel system 3 can also flow back vertically through functional element 45, in particular membrane 45, from bottom to top, i.e. in the opposite direction to the flow direction 46 as shown in FIG. 17*a*.

FIG. 17*c* shows an embodiment in which the fluid flows through the membrane 45 horizontally.

FIG. 17*d* shows a variant in which the fluid flows through the functional element 45 both horizontally and vertically. In this embodiment, two parallel channel lines 3 are provided.

The flow can be in one direction only (FIG. 17*a*) or from one direction and then from the opposite direction (FIG. 17*b*). A combination of vertical and horizontal flow is also possible (FIG. 17*d*).

The flow can be active or passive. A pressure or a vacuum can be applied. However, a passive exchange via concentration gradients or interactions between the areas separated by the functional element 45 is also possible. A cavity 47 can be located above the functional element 45, which is part of the channel system 3, wherein the functional element 45 is fluidically connected to the channel system 3.

Furthermore, this invention comprises a combination of several of these functional elements on the thumb pump.

The thumb pump experiences a further extension of its function if, according to the invention, reactants are applied in or on the functional elements, such as a filter, a membrane, frits, a paper or similar elements, in order to react with the medium or fluid flowing through it and/or with the components or fluid on one or another side of the chamber.

A time-delayed resuspension of reagents is particularly advantageous if the functional element is intended to first retain particles/components and then to react with the reagents.

According to the invention, reagents can be applied to the structured component 1 or the at least one component 4 (lid, bottom), wherein in a particularly preferred variant these reagents are provided as an arrangement or array 48. An array can be formed by the same or different reagents, e.g., DNA molecules, antibodies, apatmers, etc., as a capture molecule; this can be a DANN or protein array.

The area of the applied reagents is called the reaction space and can thus be part of the channel system 3 and/or an expansion (reaction cavity, cavity 47) or recess of the channel system.

Alternatively or additionally, these reagents can also be applied to one or more functional elements 45, such as filter, membrane, frit, paper or similar elements (FIG. 18*c*).

This allows the use of the thumb pump e.g. for biological detection reactions, wherein the functionality of the thumb pump can be extended by fluid reservoirs 16 applied to the thumb pump.

FIG. 18*a* shows an embodiment in which an array 48 with reagents is arranged in the reaction cavity 47. This array 48 with reagents is flown through by the fluid according to the flow direction 46 in the channel system 3 from left to right or from the inlet interface 5.1 to the outlet interface 5.2. FIG. 18*a* shows only one component 4, which covers the structured component 1 from above.

FIG. 18*b* shows a top view of the reaction cavity 47 with the array 48 arranged in the reaction cavity 47 and the reaction cavity 47 connected to the channel system 3 and through which the fluid flows.

FIG. 18*c* shows a structured component 1, which is covered with a component 4 on the top side and bottom side of the structured component 1, since the channel system 3 is located on both sides of the structured component 1, respectively on the top side and bottom side.

FIG. 18*c* shows an arrangement in which a functional element 45, here in particular a membrane 45, is provided with an array 48 of reagents, for example in the form of an array of catcher molecules, which are arranged in a reaction cavity 47, wherein the fluid flows in the flow direction 46 in the channel system 3 from the inlet interface 5.1 to the outlet interface 5.2 via the chamber 2 when the flexible portion 6 is actuated.

A preferred embodiment is shown in FIG. 19, where the fluid is first taken in via the fluidic interface, inlet 5.1, then passed through the functional element (filter/membrane/frit/paper or similar element), enters the chamber 2 of the thumb pump and then, when pressurized, can be passed through another functional element 45 and discharged via the outlet 5.2. For this purpose, preferably the fluidic interface 5.1 serving as an inlet is closed with a cap 14 after the fluid has been absorbed.

FIG. 19*a* shows an embodiment of a fluidic system in which two functional elements 45 in the form of a filter, a membrane, a frit or a functional paper are connected in front of and behind the chamber 2. The functional elements 45 can be similar or different, i.e. the functional element 45 in front of the chamber 2 can be configured as a filter, whereas the functional element 45 behind the chamber 2 or between the chamber 2 and the outlet 5.2 of the fluidic system is configured as a filter 45, membrane 45 or frit 45 or functional paper 45, which, for example, allow fluids with a different particle size to pass through. In the side view shown in FIG. 19*b*, the structured component 1 is covered on its top side and bottom side with a component 4 each to cover and seal the channel system 3 on the top side and bottom side. The reaction cavity 47 is located upstream of the chamber 2, where a first functional component 45 is located. A second reaction cavity 47 is located downstream of the chamber 2 and is provided with a further functional component 45. In FIG. 19*c*, the inlet 5.1, is closed with the cap 14, in order to selectively discharge the fluid only at the outlet 5.2 when pressure is applied to the chamber 2.

Figure 20:
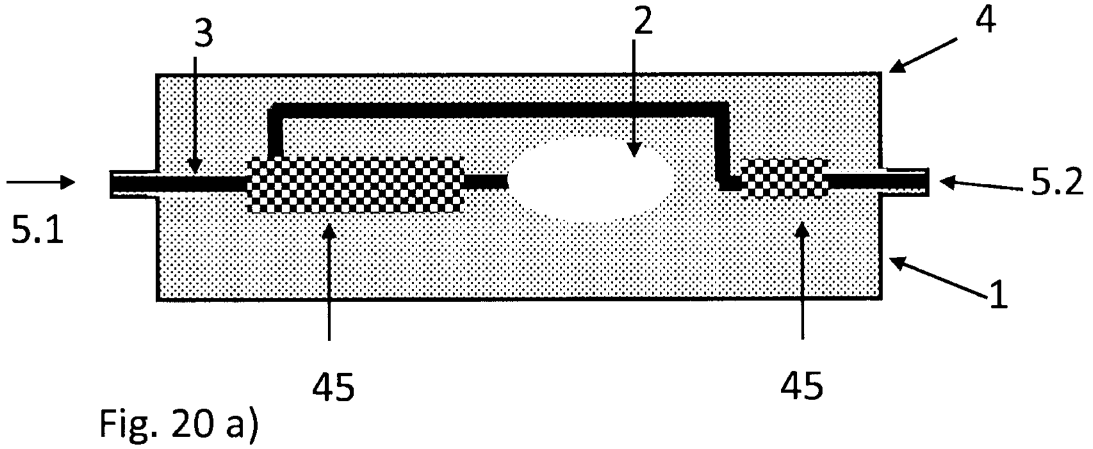
Figure 20:
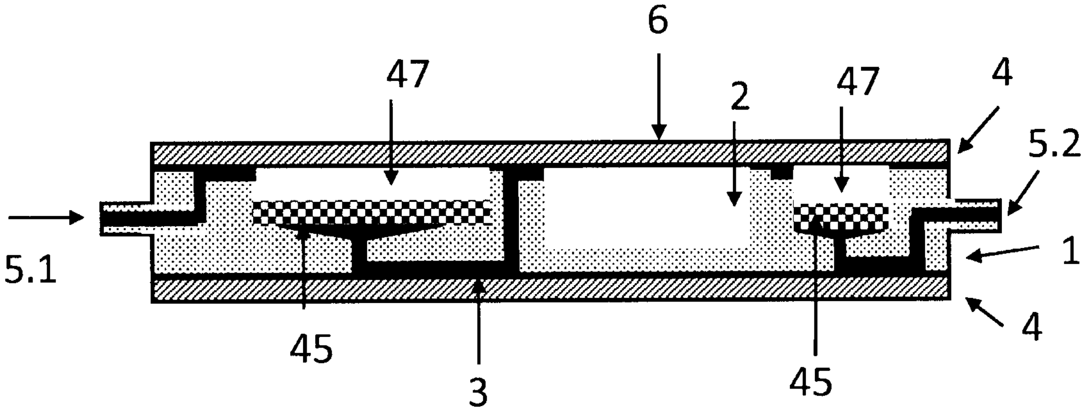
Figure 20:
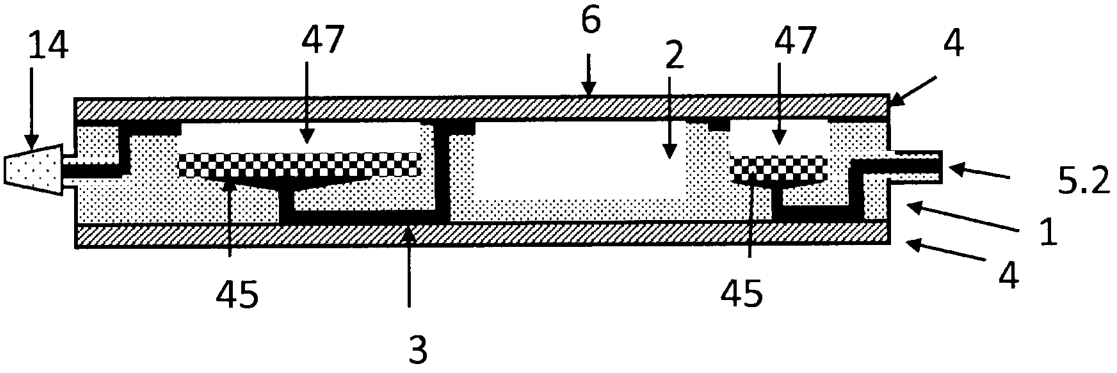

Another embodiment is shown in FIG. 20, where two functional elements 45 are arranged, wherein a first functional element 45 is located between the inlet 5.1 and the chamber 2 and a channel 3 leads from the first functional element 45 to the second functional element 45 without passing through the chamber 2. In this embodiment, the fluid is first taken in via the fluidic interface (inlet 5.1), then passed through the first functional element 45 (filter/membrane/frit/paper or similar element), then, when pressure is applied to the thumb pump, passed through a further functional element 45 and finally discharged via a further fluidic interface (5.2, outlet) by applying pressure to the chamber 2. For this purpose, the fluidic interface (5.1) serving as inlet is preferably closed with a cap (14) or otherwise after the fluid has been received.

In contrast to FIG. 19*a*, FIG. 20*a* also shows two functional elements 45. However, the second functional element 45 is not directly connected to the chamber 2 before the outlet 5.2. The first upstream functional element 45 after the inlet 5.1 is coupled to the chamber 2 so that a flow direction in the first functional element 45 can be specified by a negative or positive pressure in the chamber 2 when the flexible portion 6 is actuated. In addition to the flow through the first functional element 45, the fluid 3 in the parallel channel string is guided past the chamber 2 directly to the second functional element 45. FIG. 20*c* then shows how to close the inlet 5.1 with a cap in order to cause a flow through the first functional element 45 through the parallel channel string to the second functional element 45 when the flexible portion 6 of the chamber 2 is actuated, in order to discharge the fluid via the outlet 5.2.

Figure 21:
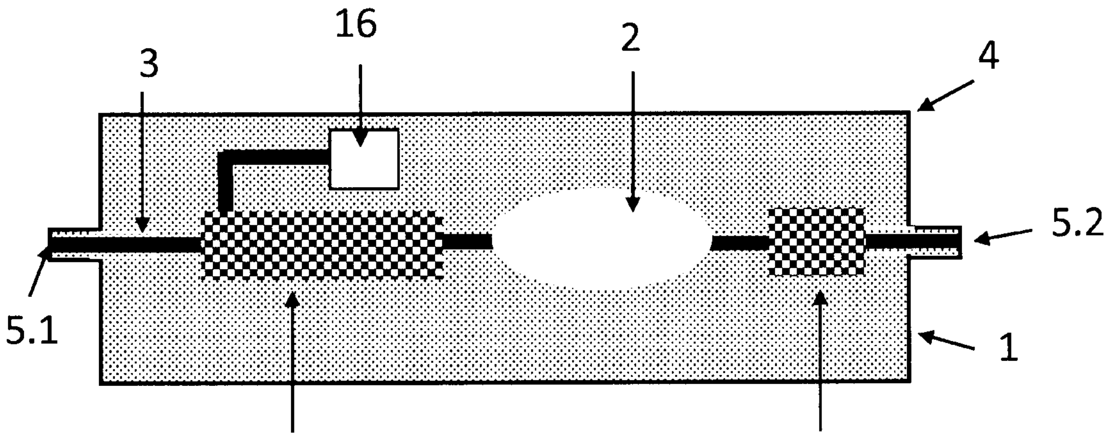
Figure 21:
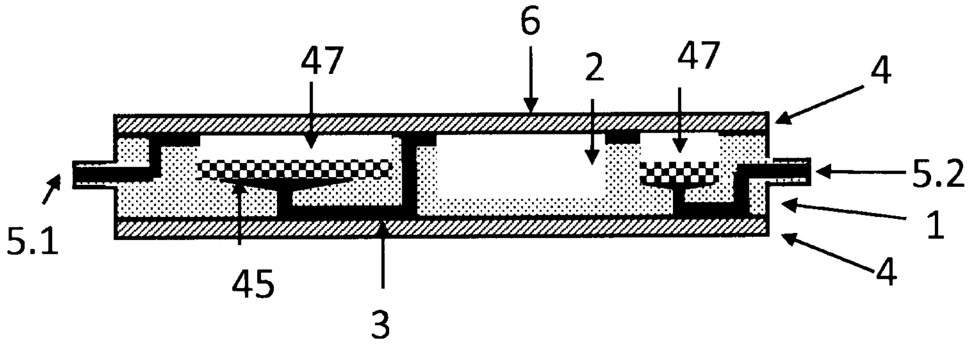
Figure 21:
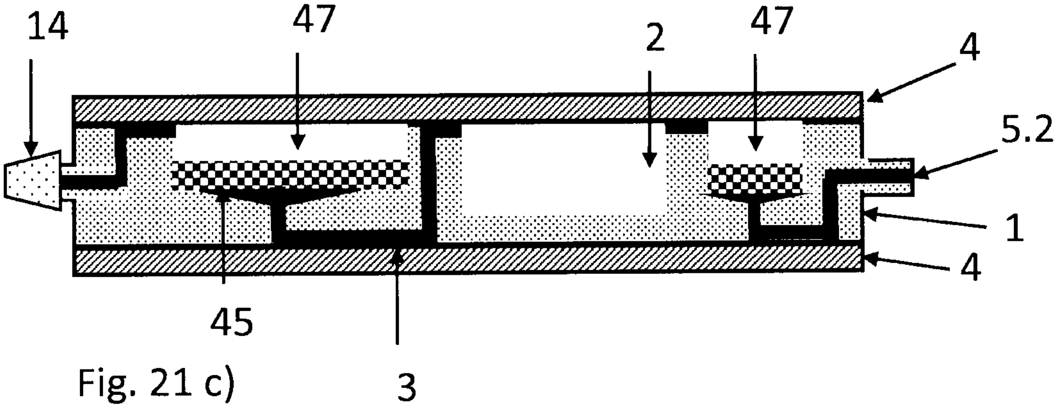

FIG. 21 shows a further embodiment, in which the fluid is first taken in via the fluidic interface (inlet 5.1), then passed through the first functional element 45 (filter/membrane/frit/paper or similar element) and then into the chamber 2 of the thumb pump. By discharging fluid from a fluid reservoir 16 e.g. in the form of a blister, fluid is added to the fluid. A mixture of fluid and added fluid can be achieved either by adding the fluid itself or by moving the thumb pump or the flexible portion 6, and can be guided through another functional element 45 by pressurization, and the diluted fluid or the fluid mixed with the added fluid is discharged via the outlet 5.2 by pressurization of the chamber 2. For this purpose, preferably the inlet 5.1 is closed with a cap 14 after the fluid has been absorbed.

FIG. 21*a* shows an alternative embodiment of the fluidic system in which the first functional element 45 is directly connected to a fluid reservoir 16 and where the fluid in the functional element 45 can be diluted by adding fluid from the fluid reservoir 16. Here, for example, a fluid can first be taken in in the inlet 5.1 by actuating the flexible portion 6 at the chamber 2 and passed through the first functional element 45, wherein, for example, certain particles can be deposited.

FIG. 21*b* shows the sectional view of this embodiment, wherein FIG. 21*c* shows that the inlet 5.1 is provided with a cap 14 in order to add fluid from the fluid reservoir 16, wherein, after actuating the fluid reservoir 16 and releasing the fluid by pressurizing the flexible portion 6 of chamber 2, the fluid is diluted in the first functional element 45 or in the second functional element 45 between chamber 2 and outlet 5.2.

Figure 22:
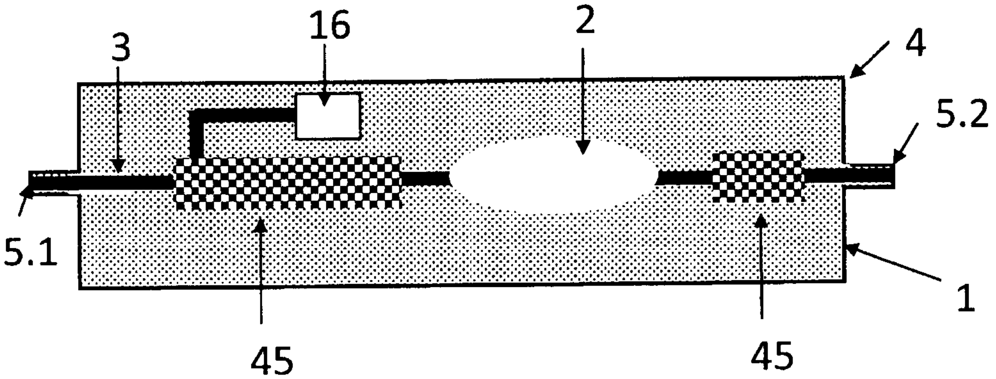
Figure 22:
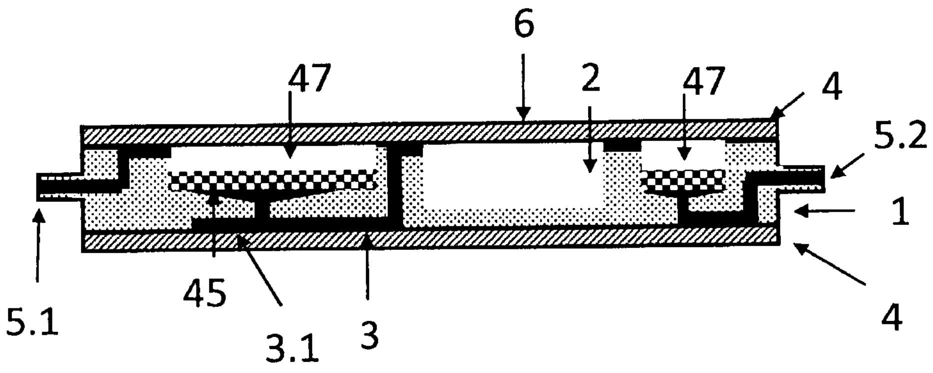
Figure 22:
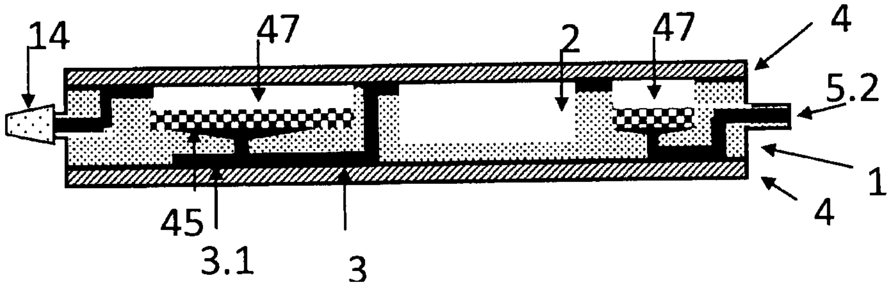

FIG. 22 shows a further embodiment, in which the fluid is first taken in via the fluidic interface (inlet 5.1), then passed through the first functional element 45 (filter/membrane/frit/paper or similar element) and then into the chamber 2 of the thumb pump.

By discharging fluid from a fluid reservoir 16, e.g. in the form of a blister, fluid is added to the fluid that has already passed through the functional element 45. The addition of fluid from the blister 16 is only carried out after passing through the functional element 45, i.e. a mixture of fluid and added fluid is achieved after processing the fluid in the functional element 45. This mixing can be achieved either by adding the fluid itself and/or by moving the thumb pump or the flexible portion 6. The mixed fluid can then be passed through another functional element 45 by pressurization and discharged via the further fluidic interface (5.2, outlet) by pressurizing the chamber 2. For this purpose, preferably the fluidic interface 5.1 serving as inlet is closed with a cap 14 after the fluid has been taken in. This means that when the fluid is added from blister 16, the 5.1, inlet is closed.

Figure 23:
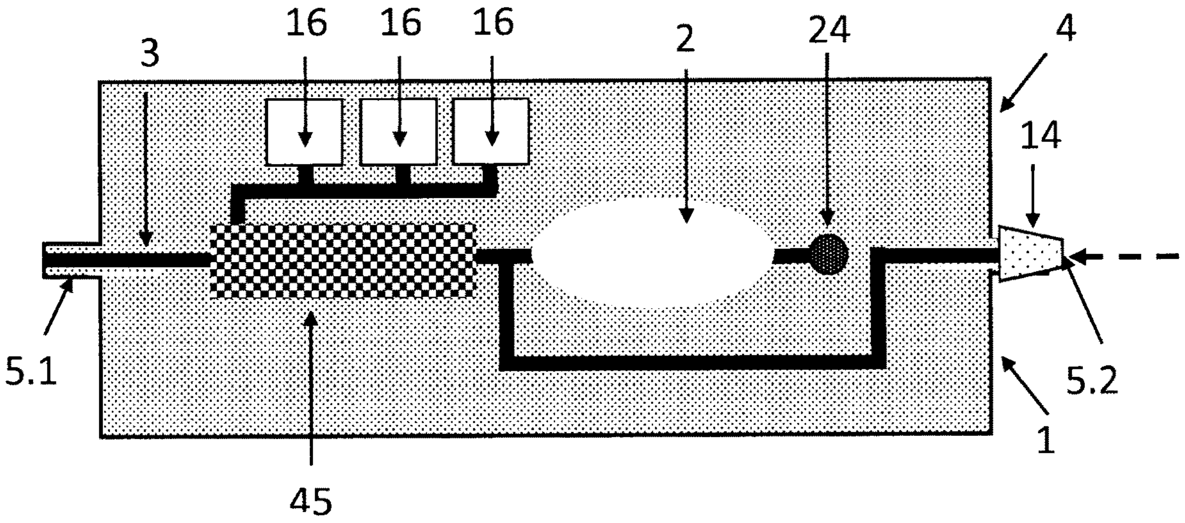
Figure 23:
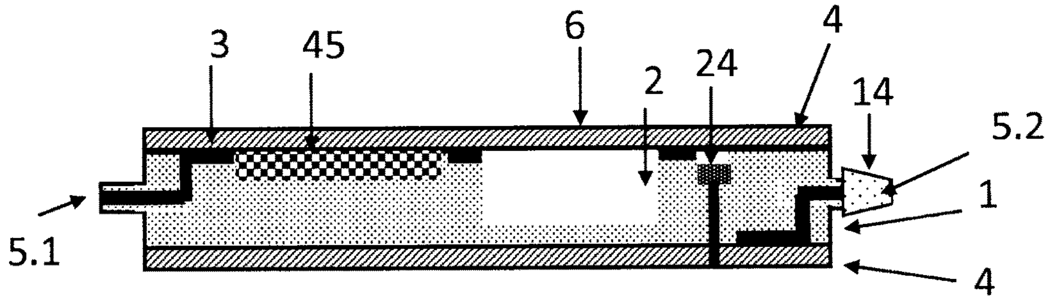
Figure 23:
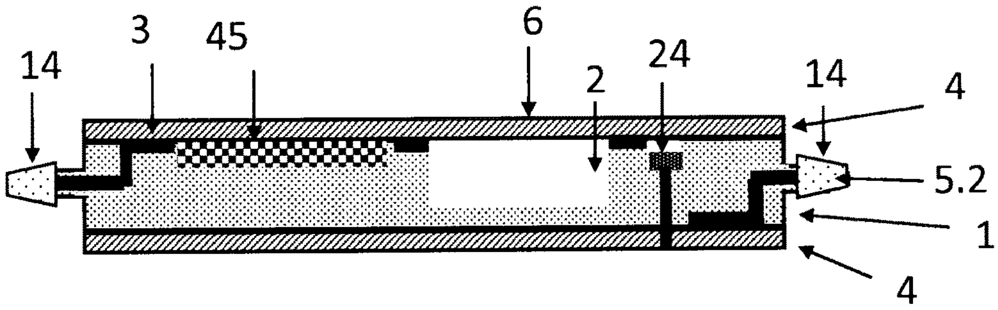

FIG. 23 shows another example where the outlet 5.2 is closed by a cap 14. This means that when pressure is applied to the flexible portion 6 of chamber 2, a fluid is taken in via the inlet 5.1 and passed through the functional element 45 and then enters chamber 2. Chamber 2 is coupled to a venting membrane 24 to vent any air remaining in the system. Afterwards, the inlet 5.1 is closed with a cap (FIG. 23*c*) and fluid is discharged from one of the fluid reservoirs 16, flushing the functional element 45 in front of chamber 2 with the fluid from the one fluid reservoir 16. In this way, components can be removed from the functional element 45 or a reaction can be triggered at the functional element 45 by the fluid. The supplied fluid then collects in the chamber 2 which can be vented via the venting membrane 24.

FIG. 23 shows that the fluidic interface 5.2 serving as outlet is closed at the beginning, e.g. with a cap 14 and the fluid is taken in via the fluidic interface (inlet 5.1), then passed through the functional element (filter/membrane/frit/paper or similar element) and enters the chamber 2 of the thumb pump. After the fluid has been taken in, the inlet 5.1 is closed, preferably by a cap 14. By discharging fluid from a fluid reservoir 16, e.g. in the form of a blister, the functional element 45 is flooded and thus components are removed or a reaction with components located on the functional element 45 takes place, e.g. antibodies for binding the antigens of a sample, reagents that cause cells to lyse, salts that change the properties of the sample or dyes for visualizations etc. The added fluid collects in the chamber 2, which is vented via a venting membrane 24. By completely filling chamber 2, it can also be ensured that, before flushing the functional element 45 with a fluid that dissolves the target components, these components reach outlet 5.2, from which the cap 14 was previously removed. In this case, the fluid is discharged through outlet 5.2 by the fluid flow generated by the fluid reservoir 16.

Figure 24:
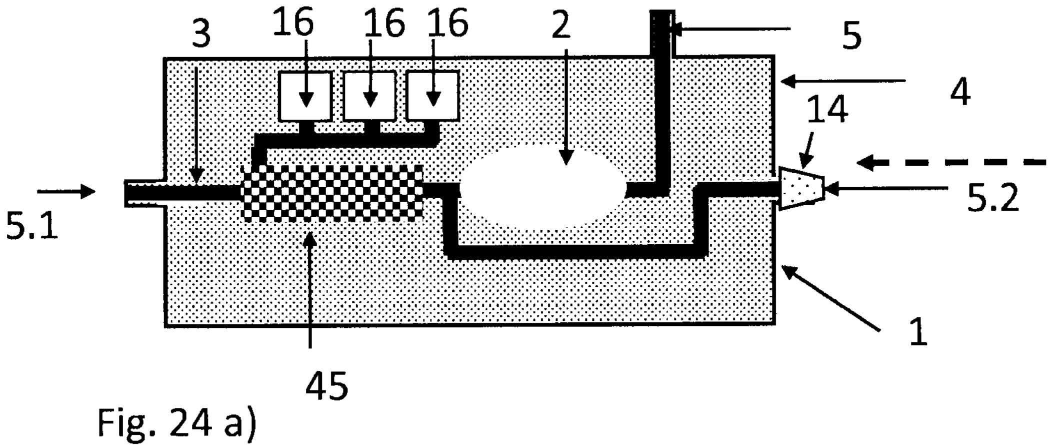
Figure 24:
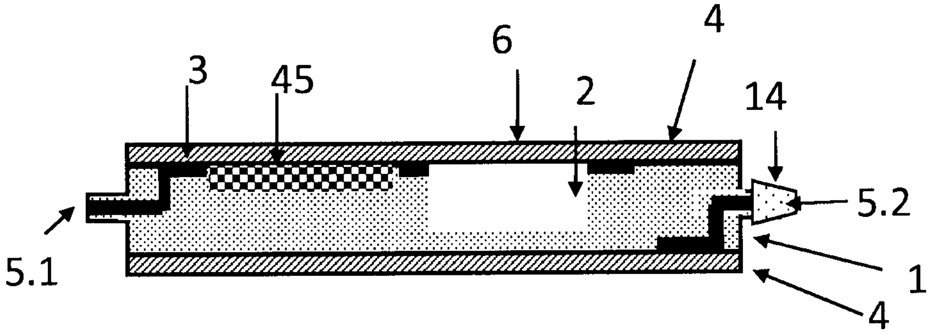
Figure 24:
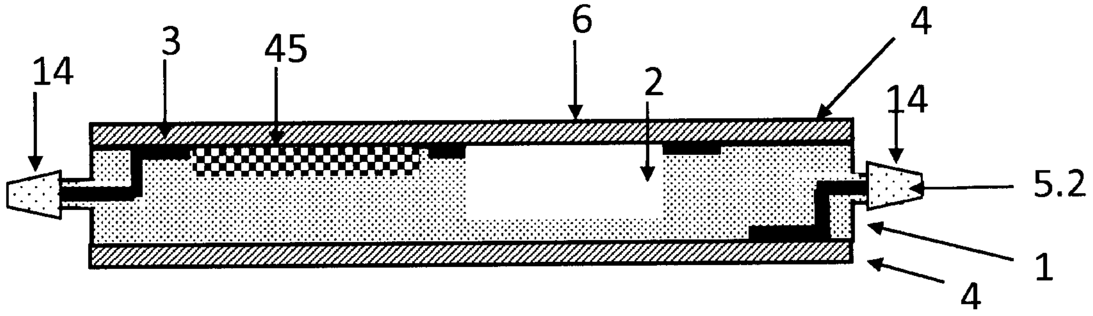

FIG. 24 shows, similar to FIG. 23, another embodiment of the fluidic system, in which the chamber 2 is connected to the outside via another fluidic interface 5, wherein the chamber 2 can be vented via this interface 5. If this additional interface 5 is closed by a cap 14 not shown, the cap can be removed from the outlet 5.2, which allows the fluid from the functional element 45 and the dissolved components to be flushed out by further fluid supply from one of the fluid reservoirs 16. It is also possible that the cap 14 remains at the outlet 5.2 and the fluid is discharged via the other interface 5.

A further embodiment is shown in FIG. 24, in which the fluidic interface 5.2 serving as outlet is closed at the beginning, for example with a cap 14 and the fluid is taken in via the fluidic interface, the inlet 5.1, then passed through the functional element 45 (filter/membrane/frit/paper or similar element) and enters chamber 2 of the thumb pump. After taking up the fluid, the inlet 5.1 is closed, preferably by a cap 14. By discharging the fluid from a fluid reservoir 16, e.g. in the form of a blister, the functional element 45 is flooded and thus components are removed or a reaction with components located on the functional element 45 takes place, e.g. antibodies for binding the antigens of a sample, reagents that cause lysing of cells, salts that change the properties of the sample or dyes for visualizations, etc. The fluid to be supplied collects in the chamber 2, which is aerated via a fluidic interface 5. If this fluidic interface is closed e.g. by a cap 14 and the cap 14 is removed at outlet 5.2, the fluid and components separated from the functional element 45 are flushed out by supplying fluid from one of the fluid reservoirs 16.

A further embodiment is shown in FIG. 25, in which the fluidic interface 5.2 serving as outlet is closed at the beginning, for example with a cap 14 and the fluid is taken in via the fluidic interface, the inlet 5.1, then passed through the functional element 45 (filter/membrane/frit/paper or similar element) and enters chamber 2 of the thumb pump. After the fluid has been taken in, the inlet 5.1 is closed, preferably by a cap 14. By discharging fluid from one of the fluid reservoirs 16, e.g. in the form of a blister, the reaction chamber 47 and the functional element 45 are flooded and thus components are removed or a reaction with components on the functional element 45, e.g. the lysis of cells, takes place. The supplied fluid and components dissolved from the functional element 45 collect in the chamber 2, which is aerated via another fluidic interface 5. If this further fluidic interface is closed e.g. by a cap 14 and the cap 14 is removed from the outlet 5.2, the fluid and components separated from the functional element 45 are flushed out by the fluid supply from one of the fluid reservoirs 16.

FIGS. 25*a*, 25*b* and 25*c* show a further configuration of the fluidic system, in which two functional elements 45 are provided and three fluid reservoirs 16, each of which can discharge a fluid and supply it to the first functional element 45 or the channel system 3. Chamber 2 is further connected to another interface 5, which either serves to ventilate chamber 2, so that chamber 2 can fill completely with fluid and a good mixing of the fluids and the fluid from the fluid reservoirs 16 can take place there. On the other hand, the additional interface 5 can also be used as an alternative outlet. If this alternative outlet 5 is closed, the diluted fluid can also be discharged via the second functional element 45 via outlet 5.2.

FIGS. 26*a*, *b* show an alternative embodiment of the fluidic system, where the fluid from the fluidic interface, inlet 5.1, flows through the first functional element 45 in the flow direction and the fluid is then forced by capillary forces, surface forces, etc. or actuating the flexible portion 6 to come into contact with the lateral flow strip 23, and the lateral flow strip 23 is flooded with the fluid by its intrinsic suction forces or an under pressure applied via the fluidic interface configured as a gas-permeable membrane 24, which supports the transfer of the fluid to the lateral flow strip 23. When using the flexible portion 6 to further transfer the fluid to the lateral flow strip 23, the inlet 5.1 is preferably closed with a cap.

FIGS. 27*a*, *b* show an alternative embodiment of the fluidic system, in which the fluid from the fluidic interface 5.1 flows through the first functional element 45 in the flow direction, the fluid then passes through a further functional element 45 and the fluid is then forced by capillary forces, surface forces, etc. or actuating the flexible portion 6 to come into contact with the lateral flow strip 23, and the lateral flow strip 23 is flooded with the fluid by its intrinsic suction forces or an under pressure applied via the fluidic interface configured as a gas-permeable membrane 24, which supports the transfer of the fluid to the lateral flow strip. If the flexible portion 6 is used to further transfer the fluid to the lateral flow strip 23, the inlet 5.1 is preferably closed with a cap.

FIGS. 28*a*-28*c* show an alternative embodiment of the fluidic system, in which the fluid from the fluidic interface, inlet, 5.1 flows through the first functional element 45 in the flow direction, the fluid then passes through a further functional element 45 and the fluid is then forced by capillary forces, surface forces, etc. or actuation of the flexible portion 6 to come into contact with the lateral flow strip 23 and the lateral flow strip 23 is flooded with the fluid by its intrinsic suction forces or an under pressure applied via the fluidic interface configured as a gas-permeable membrane 24, which further supports the transfer of the fluid to the lateral flow strip. If the flexible portion 6 is used to further transfer the fluid to the lateral flow strip 23, the inlet 5.1 is preferably closed with a cap. A channel which opens at any position before or after the functional element 45 but before the lateral flow strip 23 or in the area of the lateral flow strip 23, and which is connected to one or more fluid reservoirs 16, allows for fluid transfer, dilution and reagent supply. In addition, a waste reservoir 49 can hold used reagents, preferably connected to the channel system 3 at the end of the lateral flow strip 23.

LIST OF REFERENCE NUMERALS

1 structured module/structured component
2 chamber
3 channel system/channel
3.1 parts of the cannel system leading from the reagent reservoir
4 component
5 fluidic interface
5.1 inlet
5.2 outlet
6 flexible or movable portion (on component 4)
7 flexible or movable portion (on structured component 1)
8 second component
9 flexible or movable portion (on second component 8)
10 outlet (of the fluidic interface 5)
11, 12, 13 pushing elements, geometric elements, attachments
14 cap
16 fluid reservoir, blister
17 seat/reservoir interface
18 piercing elements
19 flap
20 latching lugs
21 detection chamber
22 widening
23 lateral flow strip
24 venting membrane (gas-permeable, fluid-impermeable membrane)
25 ventilation channels
26 distribution system
27 membrane valve
28 rotary valve
28*a* rotary valve seat
28*b* rotary valve body
29 distribution channel
41 capillary stop valves/channel tapers
42 magnifying device
43 flow limiter
44 flap
45 functional element (filter, membrane, frit, paper or similar elements)
46 flow direction
47 cavity/reaction cavity (part of the channel system)
48 reagent array, integrated reagents (e.g. DNA, RNA, protein arrays)
49 waste reservoir (part of the waste system)

The invention claimed is:

1. A fluidic system, comprising:

a flat structured component having a first main side and a second main side being parallel to each other, the flat structured component having a chamber and a channel system and at least one functional element being configured as a filter, a membrane, a frit or a functional paper, a component having an externally accessible flexible or movable portion, the component is separate and distinct from the flat structured component, wherein the chamber and the channel system are formed on the first main side in a surface of the first main side of the flat structured component, wherein at least the chamber and the channel system are closed fluid-tightly with the component and are fluidically connected to an outside via the channel system and at least one fluidic interface, wherein the at least one fluidic interface is an opening of the channel system on a side surface of the flat structured component, the at least one fluidic interface protrudes as a projection from one side surface of the flat structured component, wherein the surface of the flat structured component having the channel system and the chamber formed therein is covered by the component closing at least the chamber and the channel system of the flat structure component, wherein the externally accessible flexible or movable portion of the component is configured to be moved at least into a region of the chamber or beyond a plane of the chamber, wherein, by a movement of the flexible or movable portion of the component, fluids or gases are configured to be taken in or discharged through the fluidic interface or moved in the fluidic system, wherein the flexible or movable portion of the component is configured to be moved manually or with an operating device and it is possible to press in or move up the flexible or movable portion.

2. The fluidic system of claim 1, wherein the at least one functional element is provided with at least one reagent; and/or wherein the flat structured component and/or the component closing at least the chamber and the channel system of the flat structure component are provided with at least one reagent, and the flat structured component and/or the component closing at least the chamber and the channel system of the flat structured component are in contact with the channel system or the at least one functional element.

3. The fluidic system of claim 1, further comprising:

reagents applied to the flat structured component or the component closing at least the chamber and the channel system of the flat structure component.

4. The fluidic system of claim 3, wherein the reagents are in the form of arrays of identical or different agents.

5. The fluidic system according to claim 1, wherein a first fluidic interface is provided for receiving the fluids and the first fluidic interface is fluidically connected to the at least one functional element, wherein the at least one functional element is fluidically connected to the chamber of the fluidic system, and a second fluidic interface for discharging the fluid is connected to the chamber and/or the at least one functional element, wherein the fluid can be discharged via the second fluidic interface by pressurizing the chamber.

6. The fluidic system according to claim 1 wherein the fluids are taken in by the fluidic interface via capillary forces and/or surface tension of the channel system and/or the fluidic interface, and/or the fluids are taken in by actuating the chamber of the fluidic system.

7. The fluidic system according to claim 1, wherein at least one valve is integrated into the channel system of the fluidic system and/or wherein the at least one functional element comprises two functional elements arranged one behind the other in the channel system in a flow direction.

8. The fluidic system according to claim 1, wherein the at least one functional element provides suction forces and/or an intake of a fluid is driven by suction forces of the at least one functional element.

9. The fluidic system according to claim 5, wherein the first and/or second fluidic interface are closeable with one or two caps each; and/or in which multiple functional elements of the at least one functional element are arranged in parallel in the channel system.

10. The fluidic system according to claim 7, wherein the at least one functional element is configured to generate plasma or serum when blood flows through the at least one functional element, wherein the plasma or serum can be discharged via the second fluidic interface.

11. The fluidic system according to claim 10, wherein the at least one functional element comprises a first functional element arranged in front of the chamber in the flow direction and a second functional element arranged behind the chamber and in front of the second fluidic interface in the flow direction or wherein the first functional element is arranged in front of the chamber in the flow direction and the chamber is coupled with the first functional element, wherein the second functional element is arranged parallel to the chamber in the flow direction and is arranged before the second fluidic interface.

12. The fluidic system according to claim 11, wherein the first functional element is configured to generate plasma or a serum and wherein the second functional element removes hemolyzed red blood corpuscles.

13. The fluidic system according to claim 1, wherein a fluid reservoir is connected to the at least one functional element and/or the channel system and a dilution of the fluid in the at least one functional element and/or in the channel system takes place via a fluid discharge from the fluid reservoir.

14. The fluidic system according to claim 1, wherein a fluid reservoir is connected to the channel system and/or the at least one functional element in order to dilute a fluid in the channel system and/or the at least one functional element by means of a fluid discharge from the fluid reservoir, wherein a defined volume from the fluid reservoir is added to a defined volume of the fluid received and already passed through the at least one functional element.

15. The fluidic system according to claim 1, including a reaction cavity in the channel system and the at least one functional element being arranged downstream of the reaction cavity and/or wherein the at least one functional element is connected to a fluid reservoir.

16. The fluidic system according to claim 1, wherein a plurality of fluid reservoirs are fluidically connected with the at least one functional element and/or the channel system in order to supply the at least one functional element and/or the channel system with different fluids and/or quantities of fluid in order to free the at least one functional element from undesired components or to displace dissolved target particles.

17. The fluidic system according to claim 1, wherein a target molecule is separated from the at least one functional element by temperature change.

18. The fluidic system according to claim 1, which includes reagents which, on contact with a fluid, show a change in colour and/or a filling indicator.

19. The fluidic system of claim 18, wherein the reagents are located on the at least one functional element.

20. The fluidic system according to claim 7, in which a lateral flow strip is arranged in the flow direction after the at least one functional element.

21. The fluidic system according to claim 20, wherein the at least one functional element is configured to generate plasma or serum when blood flows through the at least one functional element, wherein the plasma or serum can be discharged via the second fluidic interface; and wherein components of the generated plasma or serum_to be detected are subsequently detected on the lateral flow strip by transferring the fluids to the strip.

22. A method for processing a fluid, the fluid being in a fluidic system according to claim 11, wherein a received fluid first flows through the first functional element and the received fluid then enters the chamber, wherein thereafter the first fluidic interface is closed and by moving a flexible portion of the chamber the fluid is forced over and/or through the second functional element and discharged via the second fluidic interface.

23. A method for processing a fluid, the fluid being in a fluidic system according to claim 11, wherein a received fluid first flows through the first functional element and the received fluid subsequently penetrates the second functional element, wherein the received fluid is discharged by means of a movement of the movable portion via the second fluidic interface.

24. A method for processing a fluid, the fluid being in a fluidic system according to claim 1, in which a received fluid is mixed with another fluid to produce a mixed fluid in a reaction cavity, and is subsequently guided across the at least one functional element, wherein target molecules of the mixed fluid remain on the at least one functional element, wherein the target molecules are dissolved by a fluid from a fluid reservoir and are discharged via the second fluidic interface.

25. A method for processing a fluid, the fluid being in a fluidic system according to claim 10, wherein a received fluid is first guided across the first functional element and particles are first retained on the first functional element, these particles are then broken down into smaller particles and supplied to the second functional element, wherein a part of the smaller particles is retained by the second functional element and can then be released again.

26. A method for processing a fluid, the fluid being in a fluidic system according to claim 16, in which, before the target particles are separated from the at least one functional element by washing with fluid from the plurality of fluid reservoirs, a cleaning is carried out by rinsing undesired components out of the at least one functional element and the undesired components are thus removed from the at least one functional element.

27. The method for processing a fluid according to claim 25, wherein the particles are cells and the step of breaking down the particles is lysis of the cells.

28. The method for processing a fluid according to claim 22, wherein a plurality of biological components are extracted, concentrated and/or purified.

29. The method for processing a fluid according to claim 28, wherein the biological components are nucleic acids, proteins, metabolites and/or antibodies.

30. A method for processing a fluid, the fluid being in a fluidic system according to claim 1, in which a target component is subsequently guided through a reaction cavity with integrated reagents, wherein a reaction occurs which allows target molecules to be detected, and/or in which the obtained target component is subsequently guided across an array and a detection reaction of the target molecules with the array takes place, and/or in which the obtained target component is detected and/or identified by the fluidic system, and/or quantitatively detected.

* * * * *